United States Patent
Mashinsky

(10) Patent No.: US 6,442,258 B1
(45) Date of Patent: Aug. 27, 2002

(54) METHOD AND SYSTEM FOR GLOBAL TELECOMMUNICATIONS NETWORK MANAGEMENT AND DISPLAY OF MARKET-PRICE INFORMATION

(75) Inventor: Alexander Mashinsky, New York, NY (US)

(73) Assignee: ANIP, Inc., Carson City, NV (US)

( * ) Notice: Subject to any disclaimer, the term of this patent is extended or adjusted under 35 U.S.C. 154(b) by 0 days.

(21) Appl. No.: 09/551,190

(22) Filed: Apr. 17, 2000

Related U.S. Application Data

(63) Continuation of application No. 09/213,703, filed on Dec. 17, 1998, now Pat. No. 6,144,727, which is a continuation-in-part of application No. 09/129,413, filed on Aug. 5, 1998, now Pat. No. 6,226,365, and a continuation-in-part of application No. 08/927,443, filed on Sep. 11, 1997, now Pat. No. 6,005,926, and a continuation-in-part of application No. 08/920,567, filed on Aug. 29, 1997, now abandoned.

(51) Int. Cl.[7] .............................................. H04M 15/00
(52) U.S. Cl. ........................... 379/114.02; 379/114.08; 379/114.09; 379/114.1
(58) Field of Search ............................... 379/111, 112, 379/113, 114, 115, 120, 121, 124, 144, 219, 220, 221; 705/23, 26; 380/23, 25, 49

(56) References Cited

U.S. PATENT DOCUMENTS

| | | |
|---|---|---|
| 4,068,101 A | 1/1978 | Chemarin |
| 4,166,929 A | 9/1979 | Shenbein |
| 4,313,035 A | 1/1982 | Jordan et al. |
| 4,313,036 A | 1/1982 | Jabara et al. |
| 4,594,477 A | 6/1986 | Noirot |
| 5,012,515 A | 4/1991 | McVitie |
| 5,027,387 A | 6/1991 | Moll |
| 5,163,042 A | * 11/1992 | Ochiai .......................... 379/220 |

(List continued on next page.)

FOREIGN PATENT DOCUMENTS

| | | |
|---|---|---|
| EP | 0501903 | 9/1992 |
| EP | 0658061 | 6/1995 |
| GB | 2198011 | 6/1988 |
| GB | 2316266 | 2/1998 |
| WO | WO 92-01350 | 1/1992 |
| WO | WO 93-16543 | 8/1993 |
| WO | WO 93-16544 | 8/1993 |
| WO | WO 93-16546 | 8/1993 |
| WO | WO 94-28683 | 12/1994 |
| WO | WO 97/16916 | 5/1997 |

OTHER PUBLICATIONS

"Survey: Telecoms", in *The Economist*, vol. 344, No. 8034 (Sep. 13, 1997), pp56/1–56/34.

(List continued on next page.)

*Primary Examiner*—Binh Tieu
(74) *Attorney, Agent, or Firm*—Chi K. Eng

(57) ABSTRACT

A system and method for flexibly routing telecommunications in an efficient manner using resources that are traded in a market are disclosed. In a preferred embodiment, service providers and requesters submit service offers and requests to a server node. Offers and requests may be submitted automatically by a telecommunications node programmed to dynamically monitor current volume and sell or buy telecommunication time or bandwidth on the basis of the actual and predicted demand. The server node administers all aspects of the trades and the resulting changes in global network operations, billing, and settlements. When a buyer wishes to use telecommunications resources it has purchased, it may pass supervision to a local telecommunications node, which may establish transmission using the purchased telecommunications resources. Particular SS7 codes, C7 codes, C5 codes, IN codes, or other data messages may be used to inform a switch in the routing path that an incoming telecommunication transaction is in transit to a different location, and is not for termination at the location of the switch so that terminating traffic may be distinguished from transit traffic. In a preferred embodiment the system is capable of displaying market-price information related to the supported telecommunications routes to prospective sellers and buyers.

101 Claims, 24 Drawing Sheets

U.S. PATENT DOCUMENTS

| | | | |
|---|---|---|---|
| 5,247,676 A | | 9/1993 | Ozur et al. |
| 5,311,583 A | | 5/1994 | Friedes et al. |
| 5,313,467 A | | 5/1994 | Varghese et al. |
| 5,353,331 A | | 10/1994 | Emery et al. |
| 5,408,518 A | | 4/1995 | Yunoki |
| 5,408,526 A | | 4/1995 | McFarland et al. |
| 5,414,752 A | | 5/1995 | Jonsson |
| 5,425,084 A | | 6/1995 | Brinskele |
| 5,425,091 A | | 6/1995 | Josephs |
| 5,438,616 A | | 8/1995 | Poeples |
| 5,479,495 A | | 12/1995 | Blumhardt |
| 5,506,887 A | | 4/1996 | Emery et al. |
| 5,515,425 A | | 5/1996 | Penzias et al. |
| 5,526,413 A | | 6/1996 | Cheston, III et al. |
| 5,533,100 A | | 7/1996 | Bass et al. |
| 5,606,602 A | | 2/1997 | Johnson et al. |
| 5,608,782 A | | 3/1997 | Carlsen et al. |
| 5,608,786 A | | 3/1997 | Gordon |
| 5,638,363 A | | 6/1997 | Gittins et al. |
| 5,661,790 A | | 8/1997 | Hsu |
| 5,675,636 A | | 10/1997 | Gray |
| 5,706,507 A | | 1/1998 | Schloss |
| 5,764,741 A | | 6/1998 | Barak |
| 5,771,279 A | | 6/1998 | Cheston, III et al. |
| 5,790,642 A | * | 8/1998 | Taylor et al. ............... 379/112 |
| 5,794,207 A | * | 8/1998 | Walker et al. ................ 705/23 |
| 5,825,858 A | | 10/1998 | Shaffer et al. |
| 5,917,897 A | | 6/1999 | Johnson et al. |
| 5,940,479 A | | 8/1999 | Guy et al. |
| 5,970,126 A | | 10/1999 | Bowater et al. |
| 5,999,598 A | | 12/1999 | Henrick et al. .......... 379/93.07 |
| 6,005,926 A | * | 12/1999 | Mashinsky .................. 379/114 |
| 6,047,006 A | | 4/2000 | Brakefield et al. |
| 6,269,157 B1 | * | 7/2001 | Coyle ......................... 379/114 |
| 6,345,090 B1 | * | 2/2002 | Walker et al. ......... 379/114.12 |

OTHER PUBLICATIONS

"Auctioning Telephone Calls", in *The Economist*, vol. 344, No. 8032 (Aug. 30, 1997), pp47–48.

"Book Review, Impact Of Liberalization On Resale And Callback Telecommunications Policy", vol. 21, No. 3, pp275–276 (1997).

Brennan, "Industry Parallel Interconnection Agreements", Information Economics and Policy, vol. 9, No. 2, pp133–149.

J. Tao & R. Martinez, "Internet Access via Baseband and Broadband ISDN Gateways", Dec. 4, 1994 (IEEE).

R. Frieden, "The International Telecommunications Toll Revenue Division Process", *International Telecommunications Handbook* (1996), pp133–149.

Y. Levy, S. Durinovic–Johri, and R.A. Milito, "Dynamic Network Call Distributiion with Periodic Updates", in *Teletraffic Science and Engineering*, vol. 1a (J. Labetoulle, and J.W. Roberts, ed.) (1994), Elsevier.

Raif O. Onvural, *Asynchronous Transfer Mode Networks: Performance Issues* (1994), Section 6.3–6.4, Artech House.

B. Yuhas & N. Ansari ed., *Neural Networks in Telecommunications* (1994), Chapter 1, Kluwer.

S. Globerman, T.H. Oum, and W.T. Stanbury, "Competition in Public Long–distance Telephone Markets in Canada", Telecommunications Policy, vol. 17, No. 4, pp297–312 (1993).

R. Frieden, "International Toll Revenue Division: Tackling the Inequities and Inefficiencies", in *Telecommunications Policy*, vol. 17, No. 3 (Apr., 1993), pp221–133.

R.J. Horrocks & R.W.A. Scarr, "Chapter 24: Tariff Principles", in *Future Trends in Telecommunications* (1993), pp 387–392, J. Whitaker & Sons.

K. Cheong & M. Mullins, "International Telephone Service Imbalances: Accounting Rates and Regulatory Policy", Telecommunications Policy, vol. 15, No. 2 (Apr., 1991), pp107–118.

R.M. Frieden, "Accounting rates: The Business of International Telecommunications and the Incentive to Cheat", 43 Federal Communications L.J. 111 (1991).

K.B. Stanley, "Balance of Payments, Deficits, and Subsidies in International Communications Services: A New Challenge to Regulation", in 43 Administrative Law Review 411 (Summer 1991).

N.F. Maxemchuk & M. El Zarki, "Routing and Flow control in High–Speed Wide–Area Networks", in *Proceedings of the IEEE*, vol. 78, No. 1 (Jan. 1990), pp204–221, IEEE.

A. Girard, *Routing and Dimensioning in Circuit–Switched Networks* (1990), Addison–Wesley, (Table of Contents only).

B. Warfield & P. Sember, "Prospects for the Use of Artificial Intelligence in Real–Time Network Traffic Management", in *Computer Networks and ISDN Systems*, vol. 20 (1990), pp163–169, Elsevier Science.

J. Potvin, & S.F. Smith, "Flexible Systems for the Design of Heuristic Algorithms in Complex Or Domains", in *Impact of Recent Computer Advances on Operations Research* (1989), pp 332–344, Elsevier Science.

G.L. Shultz & R.R. Meyer, "Flexible Parallel Algorithm for Block–Constrained Optimization Problems", in *Impact of Recent Computer Advances on Operations Research* (1989), pp 82–91.

M. Schwartz, *Telecommunication Networks* (1987), Sec. 6–2, Addison–Wesley.

* cited by examiner

| INITIAL TRADING DATE (INFORMATION DUE 3 DAYS PRIOR TO): 3/1/97 | | | | |
|---|---|---|---|---|
| CARRIER: USAGLOBAL  ID #: A45B6F9  PASSWORD: *******  SUBMITTED: 2/24/97  Offer No.: 4987654 | | | | |
| U.S. TO*: | QUALITY A# PRICE/CAPACITY LIST: 1k–100k** TIME AVAILABLE | # CIRCUITS | 101k–500k** TIME AVAILABLE | # CIRCUITS |
| AFGHANISTAN (CC 93) | 1.200 M-F 17-3/SS all | 24 | 1.185 M-F 14-10/SS all | 5 |
| 1k–300k** | | | 300k–800k** | |
| ALBANIA (CC 355) | 0.625 M-F 22-8/SS12-18 | 175 | 0.598 M-F 20-24/SS5-18 | 100 |
| Tirane (42) | 0.601 M-F 22-8/SS12-18 | 90 | 0.555 M-F 20-24/SS5-18 | 100 |
| Durres (52) | 0.625 M-F 22-8/SS12-18 | 50 | 0.598 M-F 20-24/SS5-18 | 100 |
| Elbassan (545) | 0.625 M-F 22-8/SS12-18 | 25 | 0.598 M-F 20-24/SS5-18 | 100 |
| Korce (824) | 0.625 M-F 22-8/SS12-18 | 50 | 0.598 M-F 20-24/SS5-18 | 100 |
| Shkoder (224) | 0.625 M-F 22-8/SS12-18 | 90 | 0.598 M-F 20-24/SS5-18 | 100 |

*CARRIER WILL CHOOSE U.S./FOREIGN ORIGINATION, CAPACITY RANGES AND QUALITY DESCRIPTION OFFERED ON TEMPLATE, AND WILL ENTER SPECIFIC DATA ACCORDINGLY.
**CARRIER WILL CHOOSE CAPACITY NUMBERS, IN MULTIPLES OF 100k.
RATES WILL BE GUARANTEED TO MEET DEFINING QUALITY CONSIDERATIONS.

REQUEST NUMBER: 599428
REQUESTER NAME: USAGLOBAL
REQUESTER IDENTIFICATION NUMBER: A45B6F9
PASSWORD: *******
DATE/TIME SUBMITTED: 18:42 UT, 11/30/98
QUALITY: A
ORIGINATING LOCATION: U.S.
TERMINATING LOCATION: Germany
BANDWIDTH/TIME REQUESTED: 200k min/month
NUMBER OF CIRCUITS: 50
HOURS OF OPERATION: M-F 20-24 UT

FIG.3B

| SERVICE: VOICE ||||
|---|---|---|---|
| QUALITY A:<br>Country | USA<br>Global | RSL (ITC) | Primus |
| AFGHANISTAN (CC 93) | 1.2010 | 1.6047 | 1.2500 |
| ALBANIA (CC 355) | 0.6195 | 0.5288 | 0.5540 |
| Tirane (42) | 0.6003 | 0.5288 | 0.5540 |
| Durres (52) | 0.6195 | 0.5288 | 0.5540 |
| Elbassan (545) | 0.6195 | 0.5288 | 0.5540 |
| Korce (824) | 0.6195 | 0.5288 | 0.5540 |
| Shkoder (224) | 0.6195 | 0.5288 | 0.5540 |
| ALGERIA (213) rest | 0.6589 | 0.4650 | 0.5540 |
| Bejaia (5) | | | |
| AMERICAN SAMOA (all) | 0.6667 | 0.4984 | 0.6510 |
| ANDORRA (FRANCE) (all) | 0.4057 | 0.2438 | 0.5000 |

FIG.4

| ROUTING | PRICE/MIN. | Q | R | TOTAL CAPACITY | AVAIL. CAP. | ALLOCATED CAP. |
|---|---|---|---|---|---|---|
| US-GERMANY | 18¢ | A | B | 8 | 2 | 6 |
| US-GERMANY | 22¢ | A | B | 40 | 4 | 36 |
| US-GERMANY | 23¢ | A | B | 6 | 4 | 2 |
| US-GERMANY | 28¢ | A | B | 16 | 12 | 4 |
| US-GERMANY | 32¢ | A | B | 9 | 8 | 1 |
| US-GERMANY | 50¢ | A | B | 27 | 12 | 15 |

FIG.6A

| ROUTING | PRICE/MIN. | Q | R | TOTAL CAPACITY | AVAIL. CAP. | ALLOCATED CAP. |
|---|---|---|---|---|---|---|
| US-GERMANY | 18¢ | A | B | 8 | 0 | 8 |
| US-GERMANY | 22¢ | A | B | 40 | 0 | 40 |
| US-GERMANY | 23¢ | A | B | 6 | 0 | 6 |
| US-GERMANY | 28¢ | A | B | 16 | 12 | 4 |
| US-GERMANY | 32¢ | A | B | 9 | 8 | 1 |
| US-GERMANY | 50¢ | A | B | 27 | 12 | 15 |

FIG.6B

| ROUTING | PRICE/MIN. | Q | R | TOTAL CAPACITY | AVAIL. CAP. | ALLOCATED CAP. |
|---|---|---|---|---|---|---|
| US-GERMANY | 18¢ | A | B | 8 | 2 | 6 |
| US-GERMANY | 22¢ | A | B | 40 | 4 | 36 |
| US-GERMANY | 28¢ | A | B | 6 | 4 | 2 |
| US-GERMANY | 28¢ | A | B | 16 | 12 | 4 |
| US-GERMANY | 32¢ | A | B | 9 | 8 | 1 |
| US-GERMANY | 50¢ | A | B | 27 | 12 | 15 |

FIG. 6C

| IDENTIFIER | GEOGRAPHIC ROUTE | QUALITY | SECURITY | TIME OF DAY | MARKET PRICE |
|---|---|---|---|---|---|
| *** | *** | *** | *** | *** | *** |
| 4765 | USA-GERMANY | A | A | 1300-1900 GMT | 16 CENTS/MIN |
| 4766 | USA-GERMANY | A | B | 1900-0100 GMT | 13 CENTS/MIN |
| 4777 | USA-GERMANY | B | A | 1300-1900 GMT | 12 CENTS/MIN |
| *** | *** | *** | *** | *** | *** |
| 6435 | FRANCE-AUSTRIA | A | A | 0700-1800 GMT | 8 CENTS/MIN |
| *** | *** | *** | *** | *** | *** |
| 6908 | GERMANY-AUSTRIA | A | A | 0700-1800 GMT | 5 CENTS/MIN |
| *** | *** | *** | *** | *** | *** |

FIG.15

| CUSTOMER | ROUTES OF INTEREST | |
|---|---|---|
| *** | *** | |
| AUSTRIA TELECOM | 6435, 6908 | ~1610 |
| AT&T(TM) | 1546, 3444, 4765 | |
| *** | *** | |
| OVERSEAS TELECOM | | ~1610 |
| *** | *** | |
| DEFAULT (USA) | 3967, 4555, 4765 | ~1620 |
| DEFAULT (WESTERN EUROPE) | 6435, 8999 | ~1620 |
| *** | *** | |

FIG.16

| USA-GERMANY, QUALITY "A", SECURITY "A"-16¢/MIN.; USA-FRANCE, QUALITY |

| About Arbinet | | C E I S |
| Arbinet Solutions | (a) | Voice Over IP |
| Facility Management | | IP Transport Services |
| What's New | | |
| Scheduled Events | | |
| Contact Arbinet | arbinet | |
| Arbinet Locations | | |
| Job Opportunities | | |

*Switch to the Future*

CNNfn — Click on the *Gold Laser Bar* to see a ten-minute presentation overviewing Arbinet's cutting edge technology, *and* Arbinet Founder and Chairman Alex Mashinsky's CNN interview with Anchor Steve Young.

CEIS — Consulting, Engineering, Implementation, Support
Click on the CEIS button to learn more about Arbinet's unique four step process

L_E 15570

GET Microsoft Internet Explorer

FIG.18

METHOD AND SYSTEM FOR GLOBAL TELECOMMUNICATIONS NETWORK MANAGEMENT AND DISPLAY OF MARKET-PRICE INFORMATION

This application is a continuation of 09/213,703 filed Dec. 17, 1998, now U.S. Pat. No. 6,144,727, which is a continuation-in-part of U.S. Ser. No. 09/129,413 filed Aug. 5, 1998 now U.S. Pat. No. 6,226,365, U.S. Ser. No. 08/927,443 filed Sep. 11, 1997 now U.S. Pat. No. 6,005,926, and U.S. Ser. No. 08/920,567 filed Aug. 29, 1997 now abandoned, all of which are hereby incorporated by reference.

BACKGROUND OF THE INVENTION

The cost of a long distance telephone call is usually paid by the calling party rather than by the called party. Payment for the call is typically collected from the calling party by the carrier that originated the service, either directly or through the agency of the caller's local telephone service provider. Consequently, when a call is placed from a first location served by an originating carrier to a second location served by a different terminating carrier, provision must be made to share with the terminating carrier some of the revenue collected by the originating carrier from the calling party.

For international telephone calls, this revenue sharing has traditionally been accomplished through the use of settlement agreements. Settlement agreements typically establish an accounting rate related to the cost of connecting the call between the countries, and specify how the accounting rate will be split between the two carriers. This split is typically 50-50.

For example, assume that a United States carrier and an overseas carrier negotiate a settlement agreement with a one dollar per minute accounting rate and a 50-50 revenue split. In accordance with the agreement, the U.S. carrier must pay 50 cents for every minute of connect time to called locations serviced by the overseas carrier. Conversely, the overseas carrier must pay 50 cents for every minute of connect time on calls terminated by the U.S. carrier.

As has been recognized, however, the negotiated accounting rate is frequently significantly higher than the actual cost of completing the international call. See, e.g., Frieden, Accounting Rates: The Business of International Telecommunications and the Incentive to Cheat, 43 Federal Communications Law Journal 111, 117, which is hereby incorporated by reference. For this reason, and because outbound calling volumes from the United States are significantly greater than inbound calling volumes from many foreign countries, U.S. carriers make large outbound payments to overseas carriers. In large measure, these charges are ultimately passed on to rate payers.

This payment imbalance is exacerbated when overseas carriers route inbound U.S. traffic under their control via private telephone lines into the United States. In this way, the overseas carriers are able to avoid paying high accounting rate settlements for calls to the United States from their countries, while receiving high accounting rate settlements from U.S. carriers who are forced to route outbound U.S. traffic through the overseas carrier because the overseas carrier is a monopolist in its home country. Moreover, overseas carriers often employ these alternative less-expensive routings for inbound U.S. traffic despite express contractual provisions in settlement agreements prohibiting such behavior. These developments are occurring against a backdrop of increasing data communications. From a bandwidth use viewpoint, data communications today comprise the majority of all international telecommunication. Many of the activities of routing voice communications so as to bypass international settlements occur via voice over data networks, often in the form of voice over Internet Protocol (IP).

To date, U.S. carriers have been forced to suffer such payment imbalances and have no immediate way to respond to breaches of contract by overseas carriers because of the significant time and expense required to reconfigure the telecommunications network to reroute calling traffic. The cumbersome reconfiguration process gives foreign carriers the opportunity to route inbound U.S. traffic via private lines, and otherwise run up settlement balances, without fear of retaliation from U.S. carriers.

More generally, this inflexible routing structure precludes telephone service providers from taking advantage of fluctuations in world-wide telephone rates. It would be desirable to provide a way (e.g., through dynamic routing) to respond to rate changes so as to increase the efficiency of the telecommunications infrastructure and pass the savings on to the consumer. There is also a need to provide telecommunications carriers and others (e.g., investors) with means to dynamically purchase and sell blocks of telephone connection time and bandwidth.

The need for flexible allocation of connection routes and for an ability to trade connection bandwidth accordingly exists not only in the international arena but also in any national market that allows competition in the field of telecommunications.

SUMMARY OF THE INVENTION

The present invention provides a system and method for flexibly routing telecommunications in an efficient manner using resources that are traded in a market. In a preferred embodiment, service providers (typically telecommunications carriers) submit information to a server node, which is a component of a global network. This information constitutes a service offer, which contains cost and service parameter data for routing a communication from a first location to a second location. The server node receives all of the submitted service offers, evaluates them, and generates a rate-table database. The database contains prices and associated efficient routing paths for connecting any two or more (e.g., for conferencing) locations in a telecommunications network and the parameters (e.g., quality, bandwidth, etc.) related to these routing paths. The server node may be programmed to substantially optimize the rate-table database with respect to one or more parameters, such as price, telecommunications network utilization, return traffic volumes, and others.

Service requesters (typically also telecommunications carriers) submit service requests to the server node, which identifies efficient routes that meet the requesters' requirements, and brokers sales of telecommunications resources (or connect time) from service providers to service requesters. Connect time may be purchased on a transaction-by-transaction (e.g., call-by-call) basis or in larger blocks. Purchasing a block of connect time is akin to reserving a block of telecommunications resources (e.g., a telecommunications path with specified parameters such as bandwidth and call-termination services) for the use of the service requester. Bulk-reservation requests may be submitted manually by a systems manager at the service requester (typically through the use of a terminal or other device equipped to submit such requests), or automatically by a telecommunications node associated with the service requester. Often, a service requester will also be a service provider. The telecommunications node may be programmed to dynamically monitor current volume and sell or buy telecommunication time or bandwidth on the basis of the actual and predicted demand.

The server node administers all aspects of the trades and the resulting changes in global network operations, billing, and settlements. The functions of the server node may include authentication of carriers, matching service requests with service offers, risk management, financial transactions, settlement, contract management, tracking the physical links connecting different portions of the global network, administering telecommunications nodes, updating the rate-table database, and ensuring the synchronization of all instances of that database.

When a carrier wishes to establish telecommunications (for example, a voice call) via a route it had purchased (bulk-reserved) through the global network, the carrier (service requester) passes supervision to a local telecommunications node of the global network, which establishes transmission via the bulk-reserved routing path. Alternatively, the service requester may choose to have the global network use the rate-table database to route its calls (subject to parameters established by the service requester) on a call-by-call basis over telecommunication resources offered by service providers through the server node. The local telecommunications node can compare the cost of providing service through the carrier's own network with the cost of providing it via the server node of the global network. If internal costs are within acceptable margins of the cost available in the global network, the telecommunications node may hand control of the call back to the carrier's international gateway switch. If all internal resources are occupied or if the price advantage available through the network exceeds a pre-established threshold value, the server node may continue to process the request. When the request for service reaches the server node, it evaluates the availability of matching resources based on criteria pre-established by the requester or included in the request. If a match is found, the server node acts to clear the transaction as described herein. If a match is not found, the server node signals the telecommunication node that the request is rejected. The telecommunication node may then attempt to complete the call using other means available to the carrier. The global network will permit carriers who reserved blocks of specific route capacities from service providers to resell that reserved capacity or portions thereof either as reservable bulk capacity or on a call-by-call basis. In this case, the service requester also plays the role of a service provider.

When necessary, the global network employs particular SS7 codes, C7 codes, C5 codes, IN codes, or other data messages (or combinations of the above based on the technological capability of various switches/gateways in the routing path) to inform a switch in the routing path that an incoming telecommunication transaction is in transit to a different location, and is not for termination at the location of the switch. In this way, switches can distinguish terminating traffic from transit traffic and set rates for transit traffic without invoking settlement agreement accounting rates.

In a preferred embodiment the global network is capable of displaying market-price information related to the supported telecommunications routes to prospective sellers (service providers) and buyers (service requesters) of connection time. This display is preferably in the form of a streaming banner generated by a Java applet running on the customer's PC. Buyers and sellers can, by clicking on a specific displayed component, initiate an offer to provide or request services in the context of the clicked component.

While the preferred embodiments are described in terms of a calling telephone and a called telephone, it will be understood that the invention may be practiced using all manner of user equipment. By way of example, but not limitation, this user equipment may include answering machines, fax machines, video conferencing equipment, local switches (such as in hotels or offices), voice synthesis/ recognition equipment, dialers, answering services, routers, bridges, access devices, and computers.

Moreover, while some of the preferred embodiments are primarily described in terms of a voice telephone call from a calling telephone to a called telephone, it will be understood that the global network of the present invention may embrace all classes of connectivity, including by way of example, but without limitation, data transmissions, voice over IP, PSTN transmissions, ATM, FR, packet network transmissions, and virtual networks. Furthermore, transmissions may be routed via paths composed of calling-legs which employ different transmission technologies, both wired and wireless.

BRIEF DESCRIPTION OF THE DRAWINGS

The above summary of the invention will be better understood when taken in conjunction with the following detailed description and accompanying drawings, in which:

FIG. 3A is a schematic representation of a template for placing a service offer;

FIG. 3B is a schematic representation of a template for placing a bulk-reservation request;

FIG. 4 is a schematic representation of a rate-table database;

FIGS. 6A–C schematically represent illustrative states of rate-table database 400 at various points in a telephone connect time transaction;

FIG. 15 is a schematic representation of a preferred embodiment of a market-price database;

FIG. 16 is a schematic representation of a preferred embodiment of a customer database;

FIG. 18 is an example of a webpage suitable for displaying market-price information to a customer.

DETAILED DESCRIPTION OF THE PREFERRED EMBODIMENTS

Figure 1A:
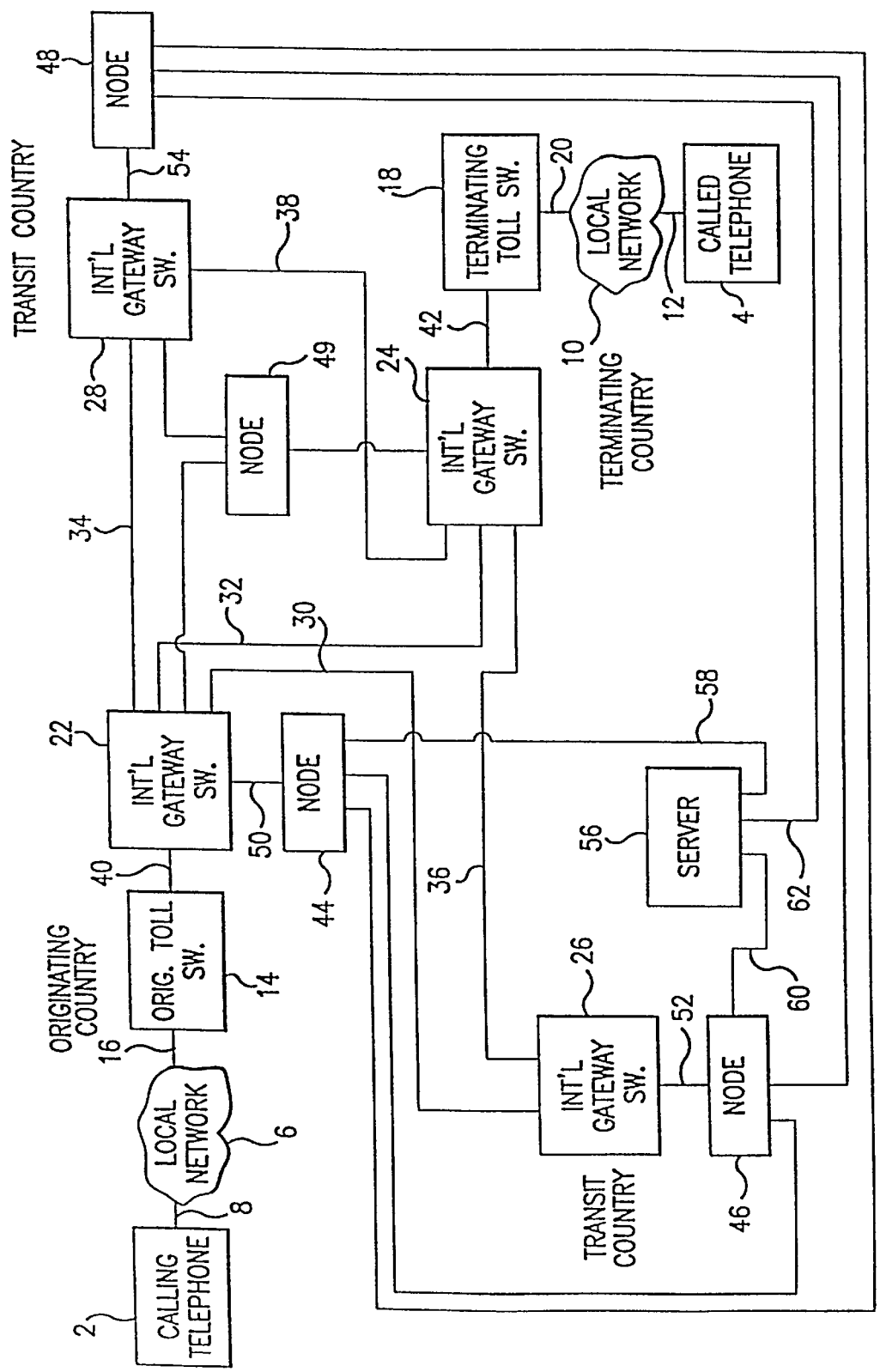
FIG. 1A is a block diagram of a telephone system architecture suitable for implementing the global network of the present invention.

FIG. 1A shows a telecommunications system architecture, which may for example be a telephone system architecture, suitable for implementing the global network of the present invention. As shown in FIG. 1A, the architecture preferably comprises a calling telephone 2 from which a calling party may place a telephone call to a called telephone 4. Calling telephone 2 is connected to a local telephone network 6 by a local loop or another connection, such as an ISDN line, represented schematically by line 8. Local telephone network 6 and line 8 are both typically owned and maintained by the caller's local telephone service provider. Called telephone 4 is similarly connected to a local telephone network 10 via a local loop or another connection, schematically represented by line 12. Local telephone network 10 and line 12 are typically owned and maintained by the called party's local telephone service provider.

Also shown in FIG. 1A is an originating toll switch 14 typically maintained by a long distance carrier. Originating toll switch 14 is connected to local telephone network 6 preferably via both signaling and transmission lines, which are jointly schematically represented by line 16. The signaling lines may, for example, form part of the SS7 network. The transmission lines carry voice and data transmissions between local telephone network 6 and originating toll switch 14.

FIG. 1A also shows a terminating toll switch 18 typically maintained by the called party's long distance provider.

Terminating toll switch 18 is connected to local telephone network 10 via both signaling and transmission lines, which are jointly schematically represented by line 20. The signaling lines may, for example, form part of the SS7 network. The transmission lines carry voice and data transmissions between local telephone network 10 and terminating toll switch 18.

The system architecture also comprises an originating international gateway switch 22 which routes and carries calls placed from calling telephone 2. Originating international gateway switch 22 forms part of a global network of international gateway switches which includes terminating international gateway switch 24, as well as transit country international gateway switches 26,28. Each pair of gateway switches in the international gateway network is preferably linked by signaling and transmission lines, represented schematically by lines 30–38.

As will be recognized, the international gateway switch, toll switch (terminating or originating), and local network in a particular location may be owned and maintained by the same or different business entities, depending on the location's regulatory environment.

Originating international gateway switch 22 is preferably connected to originating toll switch 14 via signaling and transmission lines, schematically represented by line 40. Similarly, terminating international gateway switch 24 is preferably connected to terminating toll switch 18 via signaling and transmission lines, schematically represented by line 42. The signaling lines may, for example, form part of the SS7 network. The transmission lines carry voice and data transmissions between the two international gateway switches and their respective toll switches.

Although FIG. 1A shows only four international gateway switches (22–28), a person skilled in the art will understand the architecture presented here may be generalized for any number of such gateway switches. Also, a person skilled in the art will understand that the status of a gateway switch as originating, terminating, or transit will be determined by the SS7 signaling network or other data message such as a data message transmitted in accordance with a proprietary signaling protocol. One skilled in the art will understand the structure of an analogous network architecture in a domestic market having different telecommunication providers.

The system architecture further comprises a network of telecommunications nodes 44–48. Each node in the network may be associated with one of the international gateway switches 22–28 and may be connected to its respective international gateway switch via data lines 50–54. Alternatively, a telecommunications node may be associated with multiple international gateway switches, e.g., telecommunications node 49. As described in further detail below, telecommunications nodes 44–49 comprise an overlay network which co-exists with the gateway network and manages the routing of certain calls carried via the gateway network. Nodes 44–49 may be owned by the same entity as the one that owns the switch or switches with which each is associated, or by a different entity. The location of telecommunications nodes 44–49 may be chosen as a function of economic considerations. In a preferred embodiment, nodes may be distributed so as to minimize the cost of interconnection of carriers to the network.

Figure 1B:
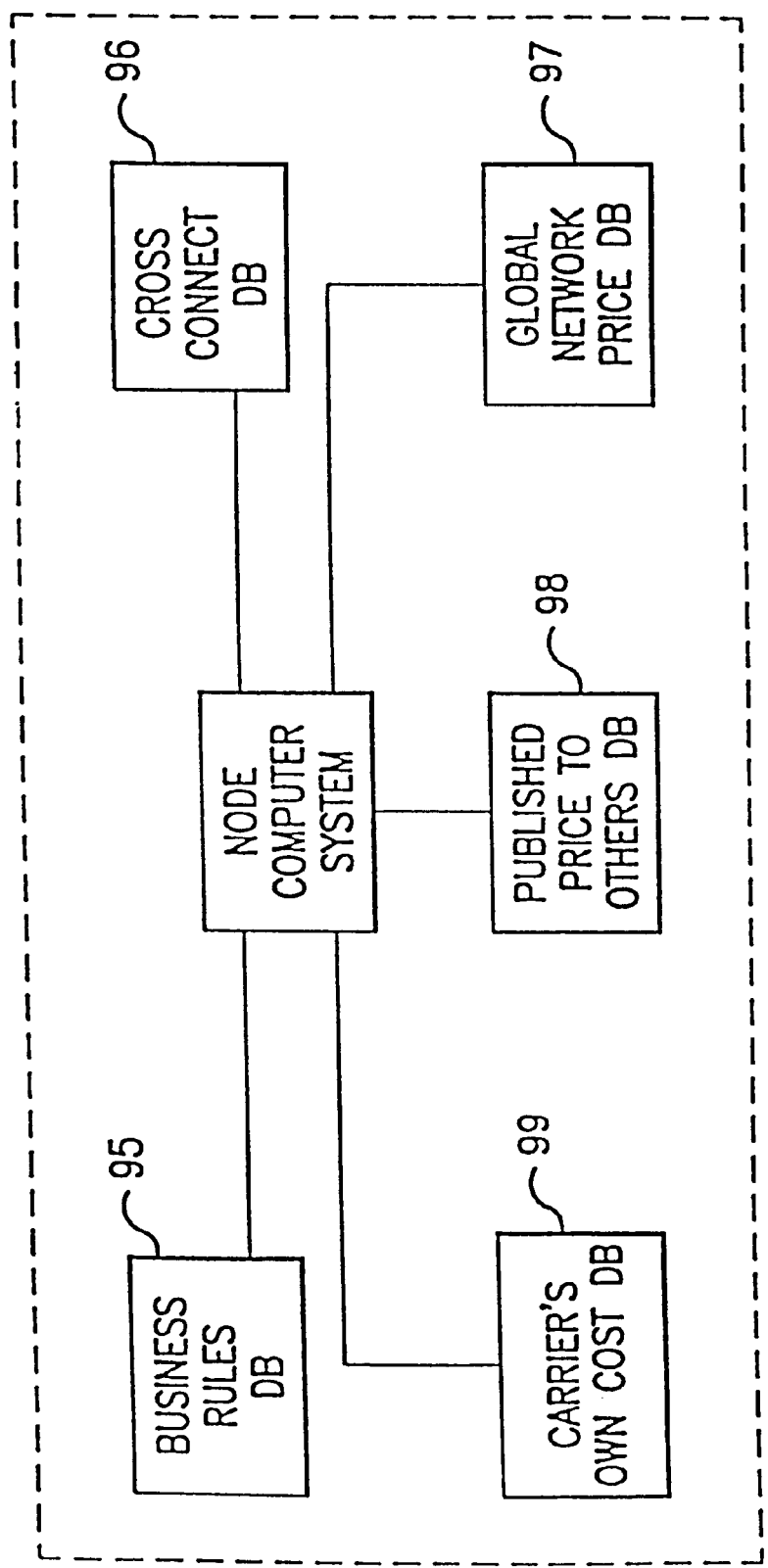
FIG. 1B is a block diagram of a telecommunications node and associated databases.

As shown in FIG. 1B, each node 44–49 is preferably provided with:

- a carrier's-own-cost database 99 (one for each carrier associated with the node), which stores information regarding the internal cost to a carrier to connect a call from potential originating locations to potential terminating locations;
- a published-price-to-others database 98 (one for each service requester associated with the node), which stores the price published by a service requester offering to connect potential originating locations to potential terminating locations;
- a global-network-cost database 97, which stores information regarding the cost of various routes for connecting potential originating locations with potential terminating locations. As described in more detail below, this information is received from server node 56 in FIG. 1A, and represents the portion of the rate table database that is relevant to the carrier(s) served by this telecommunications node.

In addition, telecommunications nodes 44–49 may further preferably provided with:

- a cross-connect database 96 (one for each carrier associated with the node), which stores information regarding the physical transmission facilities maintained by a service provider, the technologies the facilities support (e.g., circuit-switched voice, ATM, internet, etc.), and the names and locations of other carriers with which the carrier's facilities interconnect. This information is used to map the available physical interconnections of the global network;
- A business-rules database 95 (one for each service provider and service requester associated with the node), the purpose of which are described below.

The telecommunications node network further comprises a server node 56. Although shown in FIG. 1A as a single node, server node 56 may instead be implemented as a distributed network of servers. Components of the distributed network may be incorporated in nodes 44–48. Each telecommunications node 44–48 in the telecommunications node network is connected to server node 56 by data lines 58–62 respectively. Each data line preferably has a bandwidth of at least 64 Kb/s. As described in more detail below, server node 56 stores rate and possible routing information and determines cost-efficient routing paths for calls transmitted via the network. Server node 56 also clears transactions and coordinates the routing of all calls managed by the overlay telecommunications node network. Server node 56 may be owned by the same entity that owns one or more of telecommunication nodes 44–49, or by a different entity.

Figure 2:
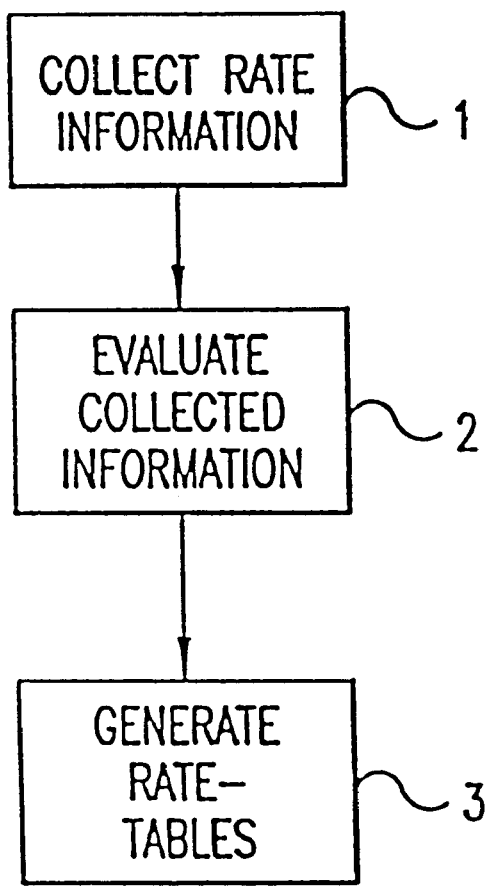
FIG. 2 is a flowchart depicting the steps performed in determining a rate-table of cost-efficient routing paths.

As shown in FIG. 2, server node 56 determines cost-efficient routing paths for calls connected via the international gateway network in three stages: (1) collecting information; (2) evaluating the collected information; and (3) generating from the collected information and a network topology map, a rate-table comprising cost-efficient routings for every pair of switches in the international gateway network. The network topology map may include both circuit-switched and packet-switched networks as well as gateway platforms disposed as part of telecommunications nodes 44–49.

In stage (1), the system collects information from international carriers (service providers) around the world who have submitted service offers to the server node. Each record of rate information includes the price charged by a service provider to route a call from a first location to a second location as well as call-volume capacity and service related parameters. These parameters may include quality, reliability, security of the transmission, legal restrictions (e.g., termination restrictions), post dial delay (PDD), type of service (e.g., circuit-switched voice, fax, data, video, messaging services, voice mail, e-mail, paging, universal mailbox), the transmission technology employed on the link (e.g., ISDN, ATM), the coding technology used (e.g., voice codecs, data compression techniques), and the signaling method necessary to control the resources offered (e.g., SS7, H.323).

Preferably, carriers (service requesters) placing a service offer will enter information via a template 300 which may be accessed at a world-wide-web secure site connected to server node 56. Alternatively, carriers who own and maintain international gateway switches, such as switches 22, 26, and 28, or who own and maintain a telecommunication node 44–48, may transmit rate information to server node 56 via telecommunications nodes 44–48. FIG. 3A illustrates one suitable arrangement for such a template. As shown in FIG. 3A, the template comprises a plurality of fields for entering information regarding an offer of service. Illustratively, these fields may include:

offer-number field 301;
provider-name field 302;
provider-identification-number field 304;
password field 306;
date/time-submitted field 308;
quality field 310 (stores the quality rating for the connection);
originating-location field 312 (stores the originating location for the offered service; where multiple gateway switches per location exist, the gateway address from which the service is offered will also be specified);
terminating-location field 314 (stores the destination location for the offered service; this may take the form of a country code, if the service is available to anywhere in the country, a country and area code, if the service is available only to particular areas in the country, or an entire destination number, if service is provided only to particular called telephones; where multiple terminating gateway switches are capable of routing the call, the specific gateway address offered will be specified);
bandwidth/time-available field 318 (stores the bandwidth/time available in, e.g., Mgbs or minutes per month);
number-of-circuits field 320 (stores the maximum concurrent number of communication connections that can be handled by the provider);
price field 322;
hours-of-operation field 324 (stores the hours of operation (which may be specified in terms of time of day, date, and/or days of the week) during which bulk-reserved connect time may be used at the price specified; time is preferably specified in universal terms such as Universal Time (UT); the price and hours-of-operation fields may be employed to construct a table listing distinct prices for distinct periods of time; this information may also be displayed in calendar form).

In addition, the template may preferably comprise the following fields:

service-type field (stores the type of service offered, e.g., voice, fax, data, video);
post-dial-delay (PDD) field (stores the maximum post dial delay for communication services included in the offer);
valid-from field (stores the date on which the offer is available for purchase);
valid-until field (stores the date until which the offer is available for purchase);
usage-pattern field 320 (stores a representation of permissible patterns of usage for the offered service. For example, limits on usage patterns may be specified in terms of the maximum number of concurrent communication links that may be maintained during specific time intervals. The field may specify distinct usage patterns for weekdays, weekend days, and holidays. In addition, this field may also store values for guaranteed throughput, peaking characteristics (burst capacity) above guaranteed throughput, etc. Permitted usage patterns may also be specified in terms of a mathematical formula, e.g., in the form of L=f(t), where L is the number of concurrent links permitted as a function of the time t. This field may preferably be presented as a calendar structure.)
legal-restrictions field (stores information on legal (e.g., regulatory restrictions) that may affect use of the connect time or price);
payment-terms field (stores any special payment terms required by the provider);
compression-level field (stores the maximum level of compression that will be employed in transmission);
compression-type field (stores the type of compression used; this is especially useful in matching encoding and decoding (transcoding) gateways so as to avoid multiple transcoding, thus permitting higher quality end-to-end connections through appropriate matching of resources along the selected route);
equipment-type field (stores the type of equipment employed by the service provider);

signaling-compatibility field (stores the signaling protocols which the provider can handle, e.g., SS7, IN, H.323); and maximum-latency field (latency in this context is the aggregate delay due to such causes as transcoding, congestion at a router, satellite, etc.).

Also, the template may preferably further comprise:

provide-local-termination? field;

provide-settlement? field;

via-private-line? field;

length-of-contract field;

via-satellite? field;

termination-options? field and carrier-preference field, the purposes of which are described below.

As those skilled in the art will recognize, the above list of fields is merely illustrative of fields which template 300 may comprise. Template 300 may include fields for additional or different information (e.g., business considerations), which would aid server node 56 in making routing decisions and brokering transactions between service providers and service requesters.

In a preferred embodiment, three levels of passwords are issued by server node 56. A first level password permits the password holder to access published rates, but does not permit the password holder to either buy (request service) or sell (offer service) time via server node 56. A second level password permits the password holder to buy (request), but not sell (offer), connect time through server node 56. A third level password entitles the password holder to either buy or sell connect time via server node 56. Thus, service providers submitting template 300 would be required to possess a third level password, since the template represents the interface required for offering service.

In one preferred embodiment, all routes listed on a single template are of the same quality. Thus, as shown for example in FIG. 3A, each template is preferably provided with only a single quality field. Service providers who wish to offer additional routes of a different quality, would do so on a different template. Also, all routes listed on a single template are preferably for the same service type. As those skilled in the art will recognize, other arrangements of templates may alternatively be employed.

Similarly, in a preferred embodiment, all routes listed on a single template are from the same originating location. Thus, as shown for example in FIG. 3A, each template is preferably provided with a single originating-location field 312. Where multiple gateway switches per country exist, the address of the gateway switch from which the service is offered will also be specified. Service providers who wish to offer connectivity from additional originating locations, would (in this embodiment) do so on a different template.

As shown in FIG. 3A, template 300 may comprise two or more hours-of-operation fields 324, number-of-circuits fields 320, price fields 322, and bandwidth/time-available fields 318 for each route listed by a service provider. This permits service providers to offer different prices for service at different times of the day and week. It also accommodates the practice of many service providers to employ a graduated pricing scale. In a graduated pricing scale, the rate charged for connect time up to a certain capacity (e.g., 300 k minutes/month) is different from the rate for connect time above that capacity. Similarly, a service provider could offer a certain price up to a specific number of circuits, then offer the same connection at another (e.g., higher) price for the remaining available circuits.

Illustratively, as shown in FIG. 3A, a service provider might list more than one price for service from the United States to Korce (city code 824) in Albania (country code 355). For example, for purchases under 300 K minutes per month, the service provider might charge 62.5 cents per minute for calls Monday through Friday 22:00 to 08:00 UT and Saturday and Sunday 12:00 to 18:00 UT. In contrast, for purchases above 300 K minutes per month, the service provider might charge 59.8 cents per minute for calls Monday through Friday 20:00 to 24:00 UT, and Saturday and Sunday from 05:00 to 18:00 UT. The days of the week are only one method of classifying time. Special days—e.g., Mother's Day, Christmas—should also be specifiable. The template may include a calendar representation for ease of use.

Also shown in FIG. 3A is an initial trading date and time field 326, which is automatically completed based on the content of field 308. Field 308 is automatically time stamped in synchronization with a universal clock maintained by server node 56. This date reflects the precise day and time that the service offer will be available on the global network. As noted on template 300, sellers are required to submit rate information some predetermined amount of time prior to the initial trading date (e.g., three days). This gives server node 56 time to process received rate information, and generate rate-tables therefrom, as described in more detail below. As those skilled in the art will recognize, the predetermined time before a service offer becomes valid may be modified in accordance with the capabilities of the global network to calculate and deploy new rates and routes, and subject to human-factor limits on rational decision-making intervals. These decision intervals can be shortened through the use of computer-trading tools by buyers and sellers. These tools can be a part of the carrier interface mechanism provided by the global network to its traders, or can be independently developed and provided.

As noted, the template may comprise additional fields not shown in FIG. 3A. For example, template 300 may include a field provide-local-termination? which stores a boolean value indicative of whether the service provider will provide local termination for the call in the location stored in terminating-location field 314 for the price quoted. Local termination might not be possible for several reasons. For example, termination might be forbidden by local regulation or the service provider might not have the equipment necessary to terminate calls in a particular location, or may not have a termination agreement (independent of the global network) with a company able to provide such service.

Template 300 may further comprise a boolean provide-settlement? field. Certain service providers are required by law to route calls in a manner such that a settlement agreement with the terminating country is invoked. Settlement agreements are invoked when a call is transmitted via the Public Switched Telephone Network (PSTN) but not when routed via private or data lines. It may therefore be important for server node 56 to establish whether a particular route offered by a service provider will trigger settlement.

Template 300 may further comprise a boolean via-private-line? field. As described in more detail below, this permits server node 56 to accommodate service requesters who do not want to purchase connect time on routes which employ private lines.

Template 300 may further comprise a boolean via-satellite? field. As noted below, server node 56 may combine services provided by more than one service provider to create a calling route from a first location to a second location. As known in the art, the quality and post dial delay of a connection employing two satellite links in a route are often unacceptable. This field permits server node 56 to avoid routing paths which employ more than one satellite link to connect the calling location and the called location.

Template 300 may further comprise a termination-options field. Illustratively, a service provider might offer fax bypass capability as a termination option. Fax bypass provides a way for substantially decreasing the cost of fax transmissions. Typically, fax transmissions are sent via telephone lines which are subject to settlement at high accounting rates. In fax bypass, a node in the route recognizes the fax tone of the fax transmission and reroutes the call via a data line. In this way, the fax may be transmitted at significantly reduced cost. In addition, as those skilled in the art will recognize, other termination options might be listed such as voice over IP. The termination option may be significant where the particular type of codec and signaling used for determination may have to be matched by the service provider.

As those skilled in the art will recognize, the types of services traded on the global network may be varied, and may include messaging services (voice mail, e-mail, universal mailbox, fax, paging), conferencing, Internet access, and other services. The price charged by service providers may depend on the telecommunications service offered; each may have a different rate assigned by the service provider. Furthermore, various levels of voice service may be provided, for example, dedicated lines and ISDN lines.

Template 300 may further include a carrier-preference field. This field may be used by carriers to exclude certain other carriers from buying (bulk-reserving) or using (on a call-by-call basis) the services offered. The field may also be used by carriers to offer special, reduced rates to certain other carriers with whom they partner. The seller may specify that this parameter overrides other parameters (i.e., that service should not be sold to the specified carriers under any circumstances) or alternatively may establish an explicit, specified cost margin that must be exceeded to override the preference against selling to the specified carriers.

After the system collects rate information from service providers around the world regarding cost and service parameters of routing various classes of calls from a first location to a second location, it proceeds to stage (2) of FIG. 2. In stage (2), the system evaluates the received information, in particular the service-related information such as transmission quality and reliability, and determines the accuracy of the provided parameters. Since server node 56 acts as the clearing house for telecommunication transactions, it is important that service requesters purchasing time from server node 56 trust the accuracy of server node 56's published service parameters. Consequently, server node 56 may independently evaluate the service parameter information received from service providers and/ or otherwise authenticate the ability of carriers to provide the telecommunications services that they offer for sale. Server node 56 then assigns for each parameter (e.g., quality) a rating such as "A," "B," "C," etc. that is universally accepted by carriers participating in the global network. The evaluation is based on information about the services of the service providers previously stored at server node 56. Server node 56 may upgrade or downgrade assigned parameters based on various considerations, e.g., the historical measurements and experiences of a particular service provider. Thus, for example, if server node 56 generally assigns satellite connections a "B" reliability rating, it might assign a particular satellite connection an "A" rating if that connection historically exhibits a higher level of reliability. The system may maintain ratings for a carrier and/or for particular routes serviced by the carrier. These ratings may be maintained adaptively, based on a smoothed average of measurements taken over time during calls.

In stage (3), server node 56 derives rate tables (from the collected rate information) which list the cost of connecting any two locations served by the telecommunications-node network via various routes, and any service parameters associated with each route. Preferably, server node 56 derives separate rate-tables for each class of service that may be provided by the global network (e.g., voice, data, video conferencing, etc.). This information is then stored in a rate-table database located in server node 56. FIG. 4 illustratively represents one possible arrangement for some of the data in rate-table database 400 representative of rates charged by different service providers for various routes.

As noted in my copending application, Ser. No. 08/811, 071, which is hereby incorporated herein by reference in its entirety, it will be recognized that a call from an originating location to a terminating location may be connected via a call routing path comprising several calling legs, each leg bridging two locations in a call routing path. Furthermore, as taught therein, each leg may be completed in either the forward or reverse direction. Thus, the routing paths determined and stored in rate-table database 400 may be formed by combining services provided by multiple service providers.

For example, if a first service provider submits a template to server node 56 offering service from the United States to the United Kingdom at a first price, and a second service provider submits a template to server node 56 offering service from the United Kingdom to Germany at a second price, server node 56 may combine the two and offer the combination as a route from the United States to Germany at a price equal to the sum of the first price and the second price. In this case the price of the first leg should not include termination, since the United Kingdom gateway switch is used for transit only.

The associated service parameter information for a route takes into account both the evaluated parameters of the submitted rate information as well as other factors that may affect a parameter assigned to a route. For example, the quality rating of a route may be determined as a function of the type of link employed to carry communications via the route. In addition, although a route may comprise two "A" quality legs, the two legs in combination may not constitute an "A" quality connection because of substantial delays in establishing the two-leg call, or cumulative service-degrading effects of the serial combination of the two legs.

Often, the application determines in large measure the parameters of importance to the call. For example, the parameters (e.g., round-trip latency) which are important for an interactive voice call are different from those required for messaging (e.g., fax), instant messaging, or voicemail.

As further noted in my copending patent application Ser. No. 08/811,071, the total number of possible routing paths between any two nodes in a network rises steeply as the number of nodes and the degree of their interconnection increase. As those skilled in the art will recognize, however, the number of routes for which rate-table entries need be calculated and stored may be kept to a manageable number for several reasons.

First, although the number of theoretically possible routes may be extremely high, many routes may be immediately excluded from the rate-table calculus because of legal or other constraints. For example, local regulations may prohibit certain transactions, such as terminating traffic originated via a private line or terminating traffic except through the local gateway switch. Rate-table entries for such calling routes need not be calculated or stored.

Moreover, as those skilled in the art recognize, heuristic techniques exist for identifying with a reasonable degree of accuracy cost-efficient routes connecting two nodes in a network. Using such known heuristic techniques, the system may choose a reasonable number of cost-efficient routing paths, and calculate and store the cost and service parameters associated with each of these routing paths.

Furthermore, as known in the art, these heuristic techniques can be employed to find approximately optimum routes with respect to one parameter while imposing constraints with respect to other parameters. Thus, for example, such heuristic techniques may identify the most cost-efficient routes for each of several quality or security levels.

Illustratively, the system might calculate the costs of five (or more, depending on anticipated traffic volumes) cost-efficient routes connecting each pair of nodes for each defined level of quality and service. These five routes would be ranked according to some parameter, e.g., price, and stored in rate-table database 400 at server node 56 for each level of service. Also, as transactions are made and routes fill up, the system may determine additional routes adaptively given the new state of the network.

Furthermore, in accordance with the teachings of my copending application, Ser. No. 08/727,681, which is hereby incorporated herein by reference in its entirety, a routing path may be constructed of several calling legs each of which employs a different technology. For example, a routing path might comprise a first leg transmitted over the public switched telephone network (PSTN), a second leg transmitted over an IP (Internet Protocol) network, and third leg transmitted over ATM. As taught in my application Ser. No. 08/727,681, calling legs of different technologies (e.g., PSTN, packet network) may be transparently linked to provide end to end connectivity between a calling party and a called party, even though some of the intermediate legs of the routing path comprise technologies with which neither the calling party nor the called party is compatible. This may require the employment of transcoding gateway resources (e.g., a media transcoding device such as required for converting from Mu-Law to G.729 voice coding standards) which may be provided as part of telecommunication services, or offered by service providers and specialized transcoding gateway-resources providers selling their services over the global network.

Once the rate-tables have been computed and stored in the rate-table database 400, copies of the database may be transmitted to each telecommunications node 44–49 in the telecommunications node network. Alternatively, each node may receive only a subset of the rate-tables calculated by server node 56 as required or on request. For example, nodes in the United States may only receive rate-tables relating to routes originating from the United States. In an alternative embodiment, the telecommunication nodes may receive a version of the tables that does not comprise cost information.

Updated rate-tables are preferably generated by the system on a periodic basis, for example, bi-weekly.

Alternatively, if the speed and power of the system's computer hardware and software permit, rate-table generation may be performed more frequently. Indeed, with sufficient computational power, the system may update its rate-tables each time a rate or service parameter in the network changes. Server node 56 will ensure that the use of each periodic update is synchronously triggered at all telecommunications nodes. This may be accomplished through means known in the art of concurrent database updating and distributed databases.

Server node 56 permits service requesters to purchase blocks of bandwidth/connect-time (using bulk-reservation requests) from originating to terminating locations, or to purchase connect time on a transmission-by-transmission basis (through a call-routing request). The latter instructs the telecommunications node to route each call through the best (e.g., least expensive) compatible route available through the global network. Server node 56 acts as a clearing house for executing transactions between service providers who wish to offer connection services and service requesters who wish to purchase connection services. This aspect of the invention facilitates an open market for telecommunications services, allowing a service requester to purchase bandwidth at the lowest available price. The transaction clearing aspect of the present invention will be described in connection with two illustrative examples. The first example (FIGS. 5 and 6A–C) illustrates a purchase of a block of connect time by a service requester using a bulk-reservation request, and connection of a call using a portion of the purchased connect time. The second example (FIGS. 11A–B) illustrates the purchase of connect time on a call-by-call basis.

Beginning with the first illustrative example, assume that a U.S. carrier (service requester) wishes to purchase 10 million minutes of "A"-level quality and "B"-level reliability connect time to Germany for the month of September, 1999 at a price not greater than 23 cents per minute. In step 502, the U.S. carrier places a bulk-reservation request with server node 56 on the above terms.

Preferably, service requesters will enter bulk-reservation requests via a template 350 which may be accessed at a secure world-wide-web site connected to server node 56. Alternatively, service requesters who own and maintain international gateway switches, such as switches 22–28, may transmit bulk-reservation requests to server node 56 via telecommunications nodes 44–49. Traders (e.g., investors who are not carriers) not connected to the telecommunications nodes will enter their orders through the secure web site.

FIG. 3B illustrates one suitable arrangement for such a bulk-reservation request template 350. As shown in FIG. 3B, the template comprises a plurality of fields for entering information regarding a reservation request. In a preferred embodiment, template 350 may comprise the following fields:

request-number field;

requester-name field;

requester-identification-number field;

password field;

date/time-submitted field;

quality field;

originating-location field;

terminating-location field;

bandwidth/time-requested field;

number-of-circuits field;

hours-of-operation field;

In addition, the template may preferably comprise the following fields:

service-type field;

post-dial-delay (PDD) field (stores the maximum acceptable post dial delay for the requested communications);

valid-from field;
valid-until field;
usage-pattern field;
require-local-termination? field;
require-settlement? field;
allow-private-line? field;
length-of-contract field;
sort-by field;
unacceptable-service-providers field; and
preferred-service-providers field.

As those skilled in the art will recognize, the above list of fields is merely illustrative of fields which template 350 may comprise. For example, fields analogous to most of the fields discussed in association with FIG. 3A may also be made part of template 350. Template 350 may include a field for any information that would aid server node 56 in making routing decisions and in brokering transactions between service providers and service requesters.

request-number field is a unique number assigned for identification and audit purposes.

date/time-submitted field is the time stamp used, e.g., to adjudicate between two similar bulk-reservation requests, where service node 56 gives precedence to the earlier request.

valid-until field permits a requester to limit the time during which the request is pending; the request becomes void at the specified date and time unless an agreement with service providers is brokered by server node 56 before then.

originating-location field and terminating-location field 362 have meanings identical to their counterparts in FIG. 3A (fields 312 and 314 respectively).

As noted above, some service providers may not be able to provide local termination for certain calls. Require-local-termination? field permits a service requester to indicate that it can provide its own local termination in the terminating location, and thus can employ service providers who do not have termination capability.

As noted above, some service requesters may require that calls be terminated in a manner that invokes a settlement agreement. Service requesters may indicate that this is so in require-settlement field.

usage-pattern field 320 stores a representation of anticipated patterns of usage for the service to be purchased. For example, limits on usage patterns may be specified in terms of the maximum number of concurrent communication links that may be required during specific time intervals. The field may specify distinct usage patterns for weekdays, weekend days, and holidays. In addition, this field may also store values for anticipated throughput, anticipated peaking characteristics (burst capacity) above guaranteed throughput, etc. Anticipated usage patterns may also be specified in terms of a mathematical formula, e.g., in the form of $L=f(t)$, where L is the number of concurrent links desired as a function of the time t. This field may preferably be presented as a calendar structure. This field enables the sharing of circuits by service requesters whose customers have complementary calling patterns.

quality field stores the overall quality ranking of the service desired by the requester. One component of quality is Post Dial Delay, which is specified separately in this preferred example.

post-dial-delay field stores the maximum number of seconds the service requester is willing to accept from the time dialing is completed to the time the called telephone starts to ring. This may affect the routes that may be allocated to a call since some routes, in particular those with many calling legs or satellite links, may take longer to connect than others.

As noted above, some service requesters may not wish a call to be transmitted via a private line. allow-private-line? field 374 permits the service requester to enter this information.

In sort-by field 376, the service requester ranks in order of importance the fields in the template relating to service parameters. For example, the service requester may rank quality as the most important field, maximum PDD as second most important, etc. As described below, server node 56 uses this information when it is unable to exactly match all service parameters contained in the service request.

In length-of-contract field, the service requester may enter the desired starting and ending date and time for which it wishes to bulk-reserve (buy) connect time. In a preferred embodiment, time may be specified in manageable units of granularity, e.g., 4 hours. For example, time periods may be specified to start and end at any of the following hours Universal Time: 00:00, 04:00, 08:00, 12:00, 16:00, and 20:00.

In unacceptable-service-providers field, the requester may place constraints on the carriers via which its traffic may be routed, or whose circuits are bulk-reserved. For example, a requester may want to avoid using the circuits of its direct competitors.

In preferred-service-providers field the requester may request that its traffic be transmitted by providers with whom the requester has special relationships, or only via one of, e.g., 5 top carriers with respect to some parameter (e.g., quality) as ranked by server node 56. In another example, if a service requester needs to buy connect time to carry overflow traffic, it may request that it not be resold time on its own network that had originally been sold to a third party.

In addition, the template may comprise an additional field that specifies the technological properties of the communications that will be provided by the requester to the service provider. For example, the originating location may deliver voice/Internet Protocol that is encoded with a specific technology; the service provider(s) must then use a compatible codec en route to the called telephone. For example, a call may be delivered to a node 44–49 as packetized voice over Internet Protocol, encoded using the G.723.1 codec at 6.3 kilobits/sec, and then be routed as a PSTN telephone call as a result of a determination that such routing represents the most cost-efficient manner to connect the call. The availability of such transcoding services may be specified in a service offer.

Figure 5:
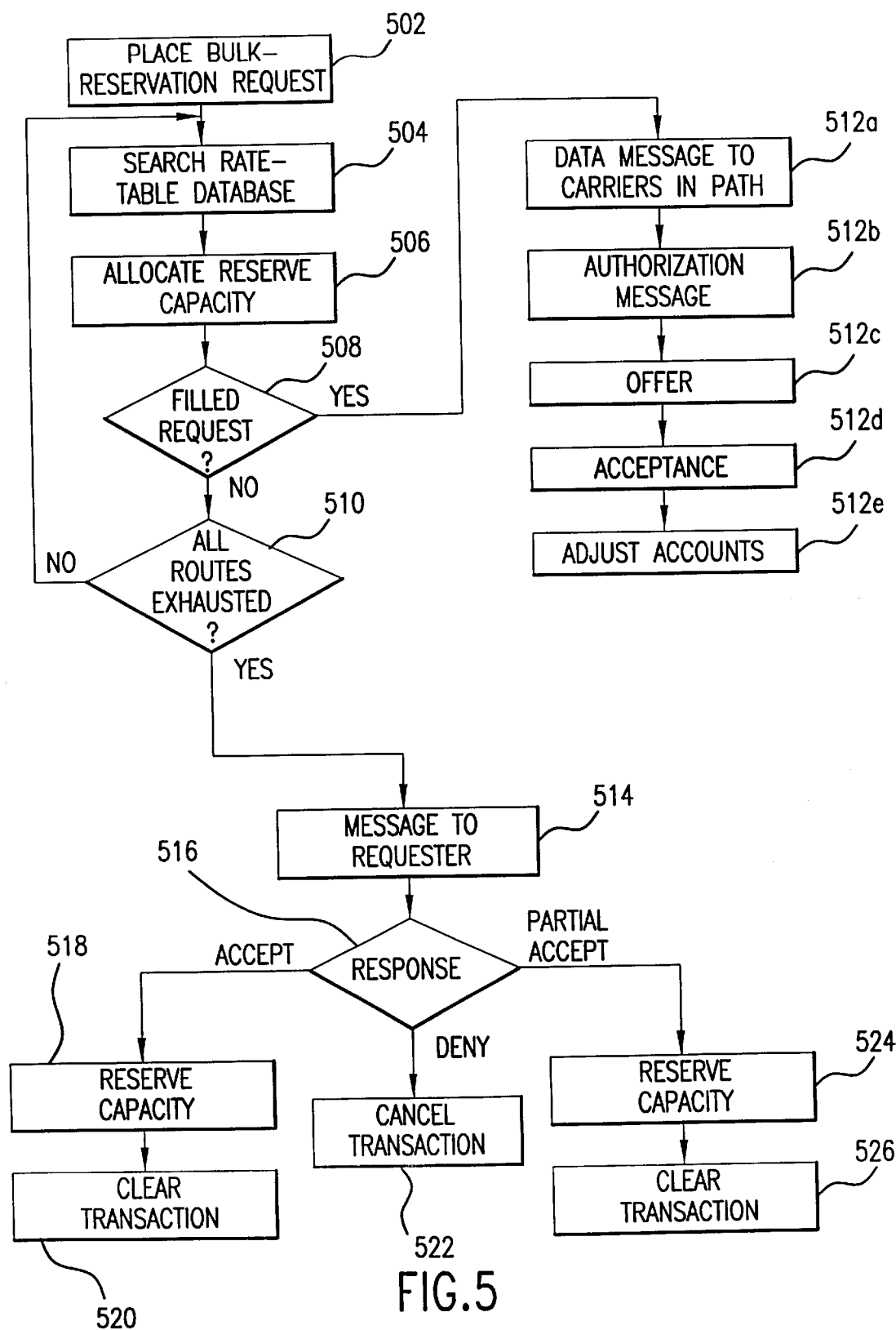
FIG. 5 is a flowchart depicting the steps performed in brokering a sale of telephone connect time.

As depicted in FIG. 5, in step 502 a service requester places a bulk-reservation service request. Upon receipt of the purchase order at server node 56, the system proceeds to step 504, where server node 56 searches rate-table database 400 in ascending-price order for routes that meet the service requester's required parameters and that have available connect time for sale. When server node 56 identifies a route with available capacity, it allocates that capacity to fill the service requester's bulk-reservation request, as depicted in step 506. Steps 504–506 are repeated until either the bulk-reservation request is filled or until all available routes that meet the service requester's requirements have been exhausted, as depicted in steps 508 and 510, respectively.

Alternatively, the system may be programmed to match the service request to a route on the basis of a predetermined subset of parameters in the request. For example, server node 56 may match the service request to a route comprising the top 5 parameters listed in the sort-by field.

For example, assume that FIG. 6A represents the state of a portion of rate-table database 400 at the time that the bulk-reservation request for 10 million voice minutes at 23 cents per minute or less is received from the service requester. In that case, server node 56 would complete the loop described by steps 504–510 three times in filling the service requester's 10 million minute bulk-reservation request. At the conclusion of the third loop, two million minutes of capacity from the least expensive route, four million minutes of capacity from the second least expensive route, and four million minutes of capacity from the third least expensive route would have been allocated to fill the service requester's bulk-reservation request. FIG. 6B represents the state of rate-table database 400 at the conclusion of this illustrative example.

In step 512*a*, server node 56 sends a data message to every service provider participating in the routing path informing the service provider that a buyer has been found for the allocated block of connect time. In step 512*b*, the service providers transmit an authorization message to server node 56, authorizing the transaction. Alternatively, the server node 56 may be preauthorized to sell any time submitted by the service providers to the global network, subject to business rules (e.g., the exclusion of certain service requesters) if desired.

In step 512*c*, server node 56 transmits a service offer to originating telecommunications-node 44 offering for sale the block of allocated connect time. In step 512*d*, originating telecommunications node 44 transmits an acceptance message to server node 56. In step 512*e*, server node 56 clears the transaction by adjusting the account balances of every service provider and service requester (whether a carrier or not) in the transaction to reflect the transfer of the allocated connect time to the service requester, and the transfer of the cost of the allocated connect time to the service providers, as described in more detail below, and transmits a confirmation message to all parties.

In a preferred embodiment, server node 56 may be operated by an entity that assures the ability of carriers and other participants to meet the financial commitments implied by their purchasing activities.

As those skilled in the art will recognize, allocated capacity may alternatively be measured using other capacity measures (e.g., max-number of concurrent calls at specific times of day/day-of-week/holiday schedules). Also, additional parameters such as blocking % at peak demand may preferably be taken into account by service node 56 when allocating resources.

In contrast, assume instead that rate-table database 400 is as shown in FIG. 6C. In that event, in response to a request for 10 million minutes at 23 cents per minute, server node 56 would complete the loop described by steps 504–510 twice, during which two million minutes from the least expensive route and four million minutes from the second least expensive route are allocated to fill the service requester's bulk-reservation request. In the example of FIG. 6C, however, the cost of all other routes connecting the U.S. and Germany is greater than 23 cents per minute. Consequently, after the second loop traversal, step 510 fails and the system proceeds to step 514.

In step 514, server node 56 transmits a data message to the service requester, informing it that its bulk-reservation request can not be completely filled at 23 cents per minute or less. The message also provides the service requester the next best price available to secure connect time between the United States and Germany (e.g., 28 cents per minute). Alternatively, server node 56 may identify rate-table entries with available connect time/band width on routes that satisfy a predetermined subset of the parameters specified in the request and transmit an offer to the requester offering to fill the remainder of its request with this service. For example, server node 56 may identify entries for routes matching the 5 most important parameters as specified in the request's sort-by field. As depicted in step 516, the service requester may respond to the message from server node 56 in three ways.

First, the service requester may transmit an acceptance, in which case server node 56 allocates the connect time (including the connect time at 28 cents per minute) to fill the service requester's bulk-reservation request (step 518). In step 520, server node 56 clears the transaction in a manner similar to that described in steps 512*a–e*.

Second, the service requester may transmit a denial, in which case, server node 56 cancels the transaction, as depicted in step 522.

Third, the service requester may accept the available minutes of connect time that satisfy its price requirement even though the amount of reservable connect time is less than originally requested. In that event, server node 56 allocates the connect time which meets the service requester's terms to the service requester, as depicted in step 524. In step 526, server node 56 clears the transaction in a manner similar to that described in steps 512*a–e*.

Server node 56 maintains a running account for each carrier or other entity (e.g., investors or speculators desiring to trade resources on the global network) that either buys or sells connect time via the global network of the present invention. Thus, once authorization of a transaction has been given by server node 56 to the service requester, server node 56 adjusts the balances of the service requester and the associated service provider(s) to reflect the purchase of service by the service requester from the service providers. Periodically (e.g., monthly), server node 56 sends statements to buyers and sellers. Such statements may include bills for entities with negative balances and forward payments to entities with positive balances. In this way, server node 56 manages settlement of all accounts. In addition, the statements may be made available for online perusal via, for example, the world wide web. Server node 56 may also transmit telecommunication status and other account status information to all buyers and sellers. This information may also be made available for online perusal via, for example, the world wide web.

Server node 56 also manages credit risks associated with the transactions and with the ongoing operations. In managing credit risks, server node 56 may reject some traders and/or carriers as bad risks, while others may have limits set on the value of telecommunications resources traded by them. This may be accomplished in combination with a financial services company.

If a carrier or other trader that purchased a block of connect time finds that it cannot use the purchased capacity, it may resell the connect time, either as blocks and/or one connect-transaction at a time (call-by-call) at a higher or lower rate than it originally paid depending on market conditions. Server node 56 may also support futures and derivatives markets for telecommunication resources (e.g., connect time). Carriers and other traders may also employ hedging techniques to protect themselves from large price fluctuations.

As those skilled in the art will recognize, the protocol described above for the purchase of a block of telecommunication time is illustrative, and other protocols may alternatively be employed. For example, the service requester may bulk-reserve a block of connection time satisfying particular service parameter requirements without specifying a price. In that event, server node 56 may identify a block of telecommunication time via one or more routes with the best available price which most closely matches the service parameters requested, and offer the block to the service requester.

In addition, the above protocol allocates capacity to requesters on a first-come-first-served basis. Thus, the above protocol allocates communications services to a requester without considering other service requests submitted before or after the request under consideration. In a further preferred embodiment an alternative protocol may employ alternative methodologies to allocate communications services to a plurality of requesters. For example, the protocol may identify all requests received within a period of time (e.g., one second) and allocate available communication resources to those requests in a manner designed to maximize the total amount of communication services sold. Illustratively, assume that for a given route and set of parameters that three service offers are pending in the server node, each for two million minutes, the first at 10 cents per minute, the second at 8 cents per minute, and the third at 6 cents per minute. Assume further that within a short interval the server node receives three requests, each for two million minutes on the given route. The first request offers to pay 6 cents per minute, the second request offers to pay 8 cents per minute, and the third request offers to pay 10 cents per minute. If the protocol follows a first-come-first-served methodology, then the server node would allocate the two million minutes offered by the 6 cent offer to the 10 cent request. In that event, the third (i.e., 6 cent) request would not be filled since the price of the remaining capacity is greater than the price offered by the requester. In an alternative embodiment, however, the protocol may concurrently process all three requests in order to maximize the amount of communication services sold by matching the 10 cent request to the 10 cent offer. This alternative embodiment may advantageously rank a plurality of received purchase requests as a function of one or more parameters, such as, e.g., price, network utilization, and/or quality. Preferably, the plurality of ranked purchase requests may be ranked in accordance with the same parameter or parameters used to rank service offers in rate-table database 400, in order to facilitate matching of offers and requests by server node 56. Also, the protocol may employ an auction methodology, such as, for example, a Vickrey-style auction, for allocating available communication services as between competing requesters. Alternatively, other auction methodologies may be employed. Also, the auction may match all service requests received through a specific point in time with all service requests received through that same point in time, including requests and offers already matched in previous auctions in order to enable optimization of all resources based on the latest available information rather than optimizing only incremental activity.

An overview of a call-routing operation of the global network of the present invention will now be described in connection with FIG. 7. Each of the stages shown in FIG. 7 will then be explained in greater detail in connection with FIGS. 8–10.

Figure 7:
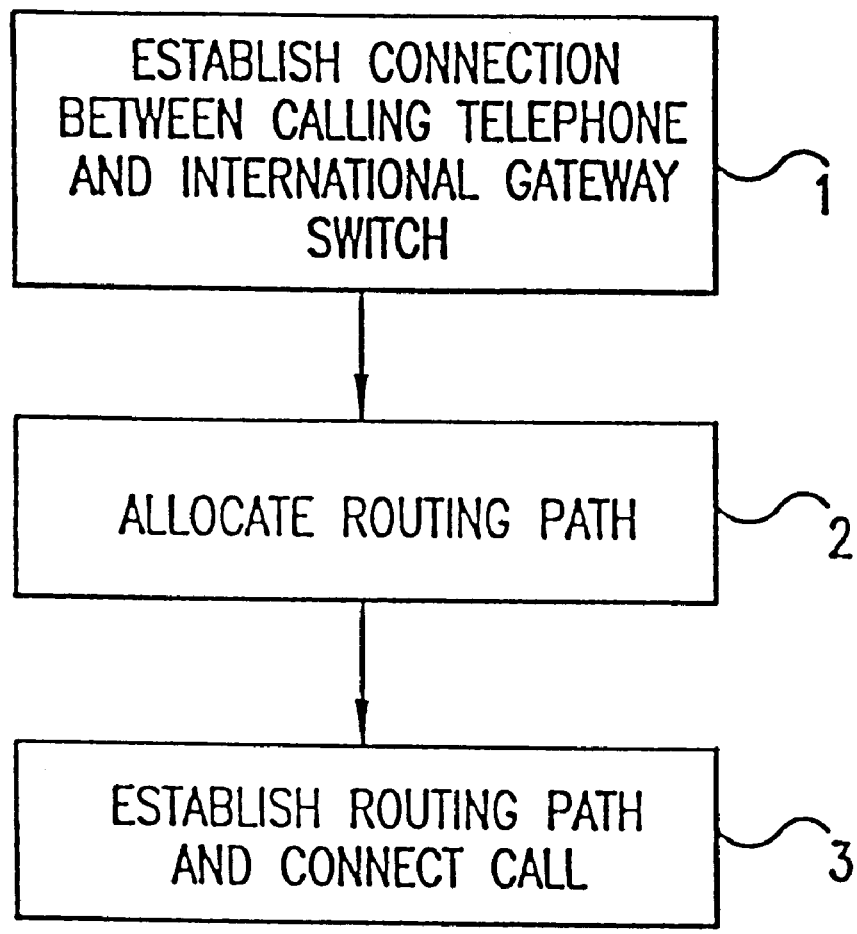
FIG. 7 is a flowchart depicting a call-routing operation of the global network of the present invention.

As shown in FIG. 7, a preferred embodiment employs a three-step process for routing any call from a calling telephone to a called telephone. In stage (1), a connection is established between calling telephone 2 and originating international gateway switch 22. In stage (2), the system allocates a routing path to connect the call to the called location. In stage (3), the routing path is established and the calling party is connected to the called party.

The three step process will be described using an illustrative example showing the routing for one exemplary call from an originating location to a terminating location. As those skilled in the art will recognize, this example presents a relatively simple set of potential call routings. However, as noted in my copending application, Ser. No. 08/811,071, a call from an originating location to a terminating location may be connected via a path comprising many legs, each leg bridging two locations in a call routing path. Furthermore, as taught therein, each leg may be completed in either the forward or reverse direction based on the availability of connect time and of the service type requested, and the resulting cost.

When the present application is taken together with my copending application Ser. No. 08/811,071, those skilled in the art will recognize how the teachings of the present invention may be applied to the selection of desired call routings, including ones with many calling legs, both in the forward and reverse direction.

The illustrative call routing example will now be described in connection with FIG. 1A. Turning to FIG. 1A, assume that the originating location for the call from calling telephone 2 to called telephone 4 is the United States and that originating toll switch 14 and originating international gateway switch 22 are owned and maintained by AT&T (TM). Assume further that the terminating location for the call is Germany, and that terminating toll switch 18 and terminating international gateway switch 24 are owned and maintained by a German telephone company which is a monopolist. Assume further that international gateway switch 28 is located in the United Kingdom (U.K.) and is operated by British Telecom (TM) (BT). Finally, assume that international gateway switch 26 is located in Belgium and is operated by Belgacom (TM), a Belgian carrier.

Assume further that the 10 million minutes of purchased connect time described above in connection with FIG. 5, is divided between three routing paths which connect AT&T's international gateway switch 22 to the German telephone company's international gateway switch 24. With reference to FIG. 1A, the first routing path connects the call directly to Germany's international gateway switch 24 via line 32. The second routing path connects the call to international gateway switch 24 via international gateway switch 28 in the U.K. and lines 34, 38. The third routing path connects the call to international gateway switch 24 via international gateway switch 26 in Belgium and lines 30, 36.

Figure 8:
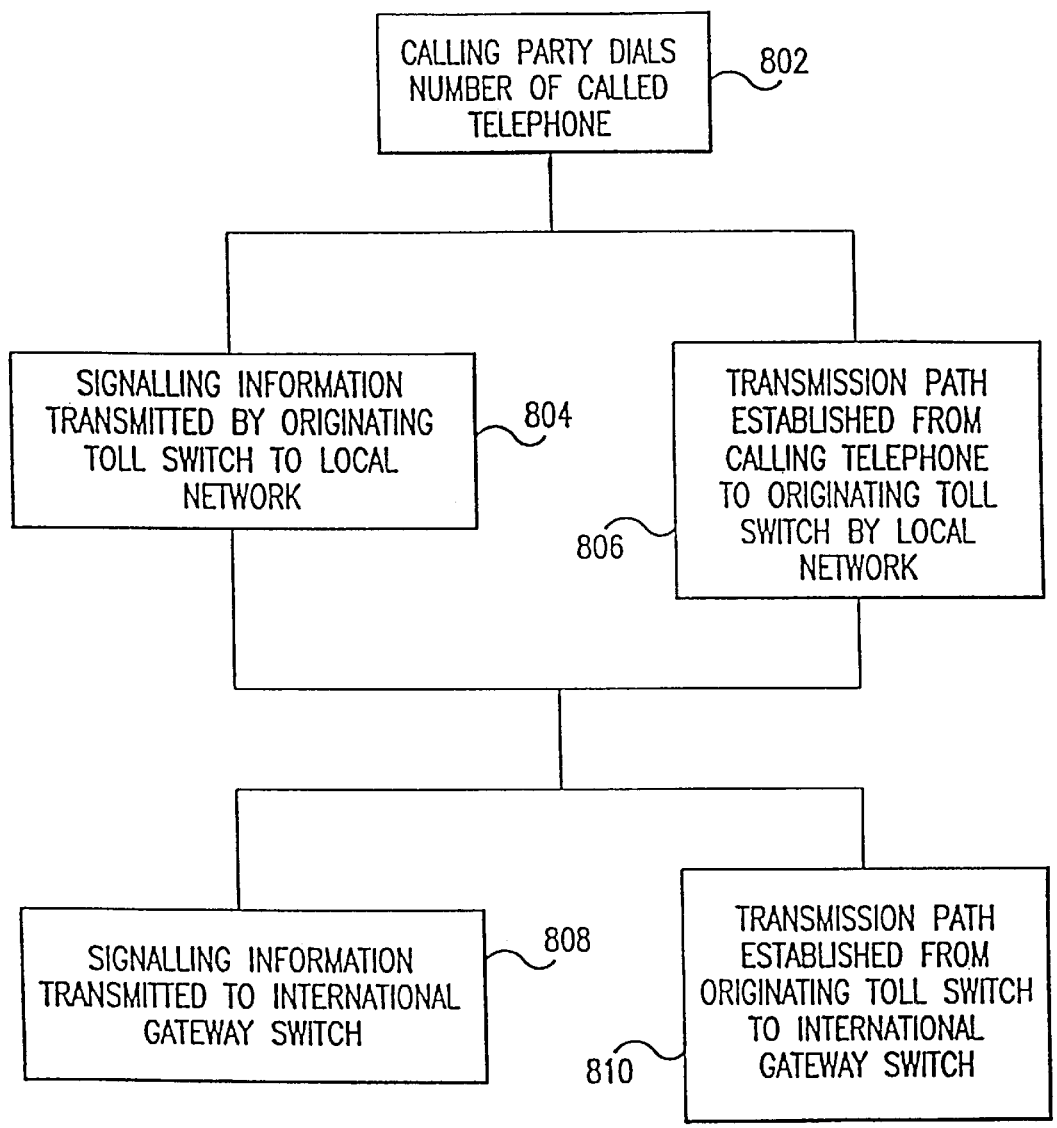
FIG. 8 is a flowchart depicting in greater detail a first portion of the call-routing operation depicted in FIG. 7.

Stage (1) of the process shown in FIG. 7 will now be described in more detail in connection with the flowchart shown in FIG. 8. Turning to FIG. 8, in step 802, the caller dials the telephone number of called telephone 4 from calling telephone 2. The dialed number will typically comprise a prefix (such as O11) signifying that the call is an international telephone call. The dialed number will further comprise a country code (e.g., 49 for Germany) and area code (89 for Munich) representative of the overseas location to which the call is being placed. Local telephone network 6 is programmed to recognize overseas calls and to route such calls to the caller's long distance carrier.

Thus, in step 804, local telephone network 6 transmits appropriate SS7 signaling information regarding the call to originating toll switch 14 via line 16. Supervision is thus passed to originating toll switch 14. Concurrently, in step 806, local telephone network 6 creates a path through the local network's transmission lines to establish a connection between calling telephone 2 and originating toll switch 14.

From the signaling information, originating toll switch 14 recognizes the call as an overseas call, and routes the call to originating international gateway switch 22. In particular, in step 808, originating toll switch 14 transmits appropriate SS7 signaling information to originating international gateway switch 22, thereby transferring supervision to switch 22. Concurrently, in step 810, the long distance network creates a path (circuit) through its transmission lines to establish a connection between calling telephone 2 and originating international gateway switch 22.

Thus, as described above, in stage (1) a transmission connection is established between calling telephone 2 and originating international gateway switch 22, and supervision for the call is passed to originating international gateway switch 22.

In stage (2), the system allocates a route for the call from calling telephone 2 to called telephone 4. Stage (2) is described in more detail in connection with the flowchart shown in FIGS. 9A–B.

Figure 9A:
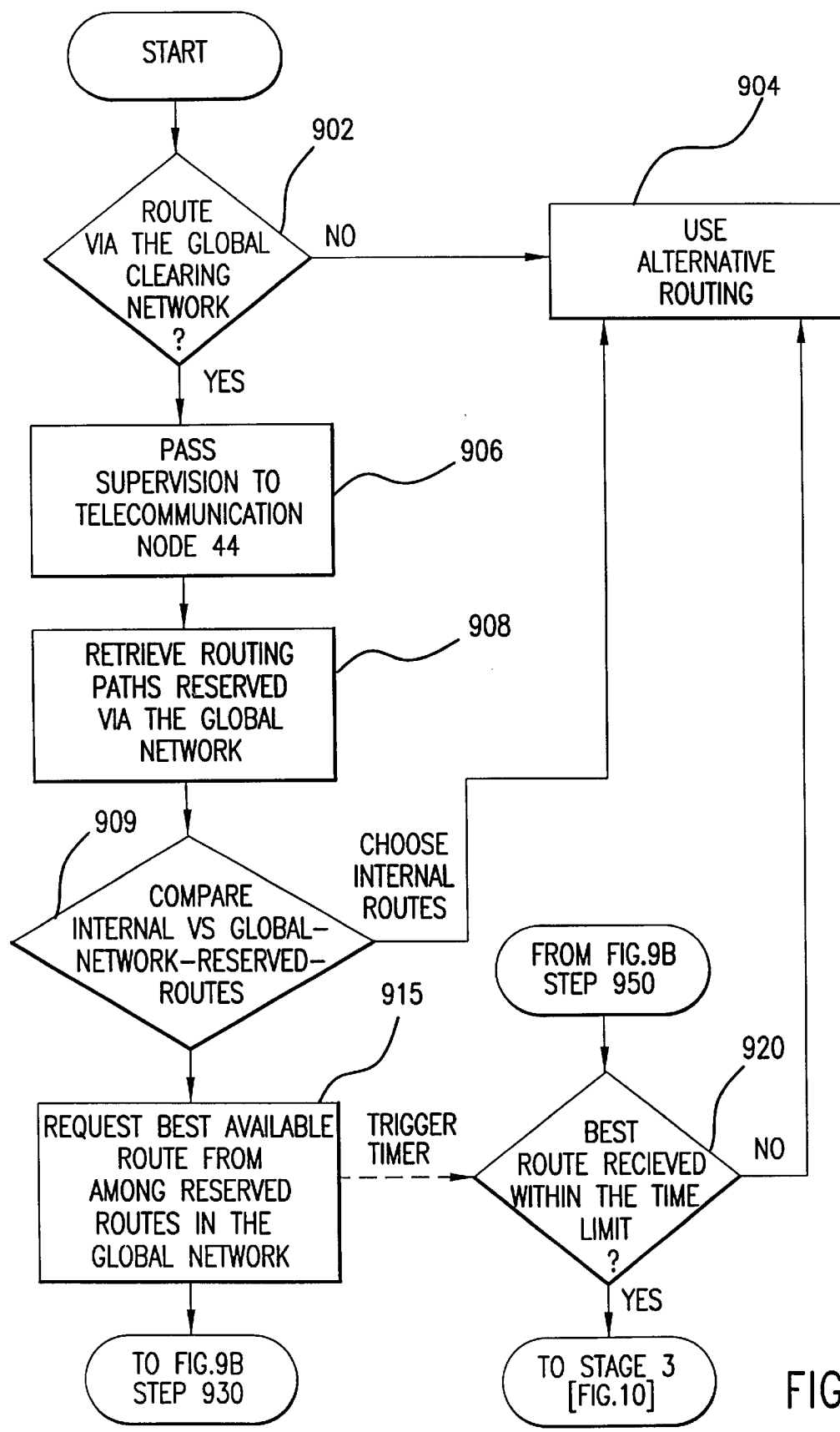
FIGS. 9A–B are a flowchart depicting in greater detail a second portion of the call-routing operation depicted in FIG. 7.

Turning to FIG. 9A, in step 902, originating international gateway switch 22 determines whether the called location is one to which it may route calls via the global network. If decision step 902 fails, international gateway switch 22 employs alternate means for connecting to the called location, as depicted in step 904. Otherwise, if decision step 902 succeeds, international gateway switch 22 passes supervision to originating telecommunications node 44, as depicted in step 906, for routing the call to the terminating location.

In step 908, telecommunications node 44 retrieves from memory the routing paths on which the originating carrier (service requester) has purchased connect time. As noted above, in connection with FIG. 1B, telecommunications node 44 is provided with several databases 97–99 which store information on the network cost, published cost, and global network cost for connecting calls to the called location. Thus, in decision step 909, telecommunications node 44 compares the various costs retrieved from databases 97–99, and determines whether to route the call via its own network connections, or via a route purchased through the global network.

Decision step 909 may incorporate a procedure which applies sophisticated business rules to determine whether to use internally available routes or to seek connection via the global network. For example, telecommunications node 44 might be programmed to route the call via a global network route, unless the cost of that route is greater than 90% of the network cost of connecting the call.

If decision step 909 chooses not to use the global network, the system proceeds to step 904, and connects the call via an alternative route (e.g., by passing supervision beck to gateway switch 22). Otherwise, the system proceeds to step 915, where telecommunications node 44 sends a callrouting request to service node 56. The system then proceeds to FIG. 9B step 930, while simultaneously triggering a timer that is queried in step 920.

In step 930, server node 56 searches among the paths bulk-reserved by the service requester, and selects the best available circuit(s) for carrying the call given the service parameters on record. The system proceeds to step 940 to determine whether the identified circuit is available. In particular, server node 56 queries each telecommunications node in the path as to the availability of ports to carry the call.

If an appropriate circuit on a route previously bulk-reserved by the service requesters is available, the system proceeds to step 950, where server node 56 signals to telecommunications node 44 the identity of the available circuit. The system then proceeds to step 920, as described below. Otherwise, as depicted in step 945, steps 930–940 are repeated until either an available bulk-reserved circuit is identified, or until all bulk reserved routes have been examined. If no appropriate path previously bulk-reserved by the service requester is available, the system proceeds to step 955.

In step 955, service node 56 determines whether the agreement with the service requester (or the specific call-routing request received) permits call-by-call routing over non-reserved circuits using resources available through the global network. If permitted, the system proceeds to FIG. 11A, step 1103 and a routing for the call is identified as described below in connection with FIG. 11. If call-by-call routing on non-reserved circuits is not permitted, the system proceeds to step 957.

As those skilled in the art will recognize, the search for an available circuit could be performed concurrently from among reserved and non-reserved (call-by-call) paths, which can be compared by node 56 and selected according to a pre-established policy dependent on a single or multiple criteria.

In step 957, service node 56 signals to telecommunications node 44 that no circuits are available through the global network, and the system proceeds to step 904 described above.

In step 920, if the identity of an available circuit has been signaled to node 44 within an allotted time period measured by the timer, the system proceeds to stage (3) of FIG. 7, where the identified route is established and the caller is connected to the called party. Stage (3) of FIG. 7 is described below in detail in connection with FIG. 10. Otherwise, the system proceeds to step 904, where supervision is returned to the originating gateway switch, which seeks an alternative route not using the global network.

As noted in the background of the invention above, it has not been possible to date to cost-effectively and dynamically route calls via the international gateway network because of the lengthy contractual negotiations and physical reconfiguration which were required to establish new call routings. Without reconfiguration, the international gateway switches were unable to distinguish incoming terminating traffic from incoming transit traffic and could not dynamically redirect calls without human intervention. As a result, all incoming traffic was treated as terminating traffic subject to high settlement agreement accounting rates or was based on prenegotiated contracts and static links which could not be easily modified. As described in more detail below, the present invention overcomes this drawback of the prior art and permits dynamic routing of transit and terminating traffic to gateway switches in the gateway network or any other network.

For purposes of this example, assume that the routing decision made in stage (2) of FIG. 7 above is that the call from calling telephone 2 to called telephone 4 should be routed via international gateway switch 28 in the U.K.

Figure 10:
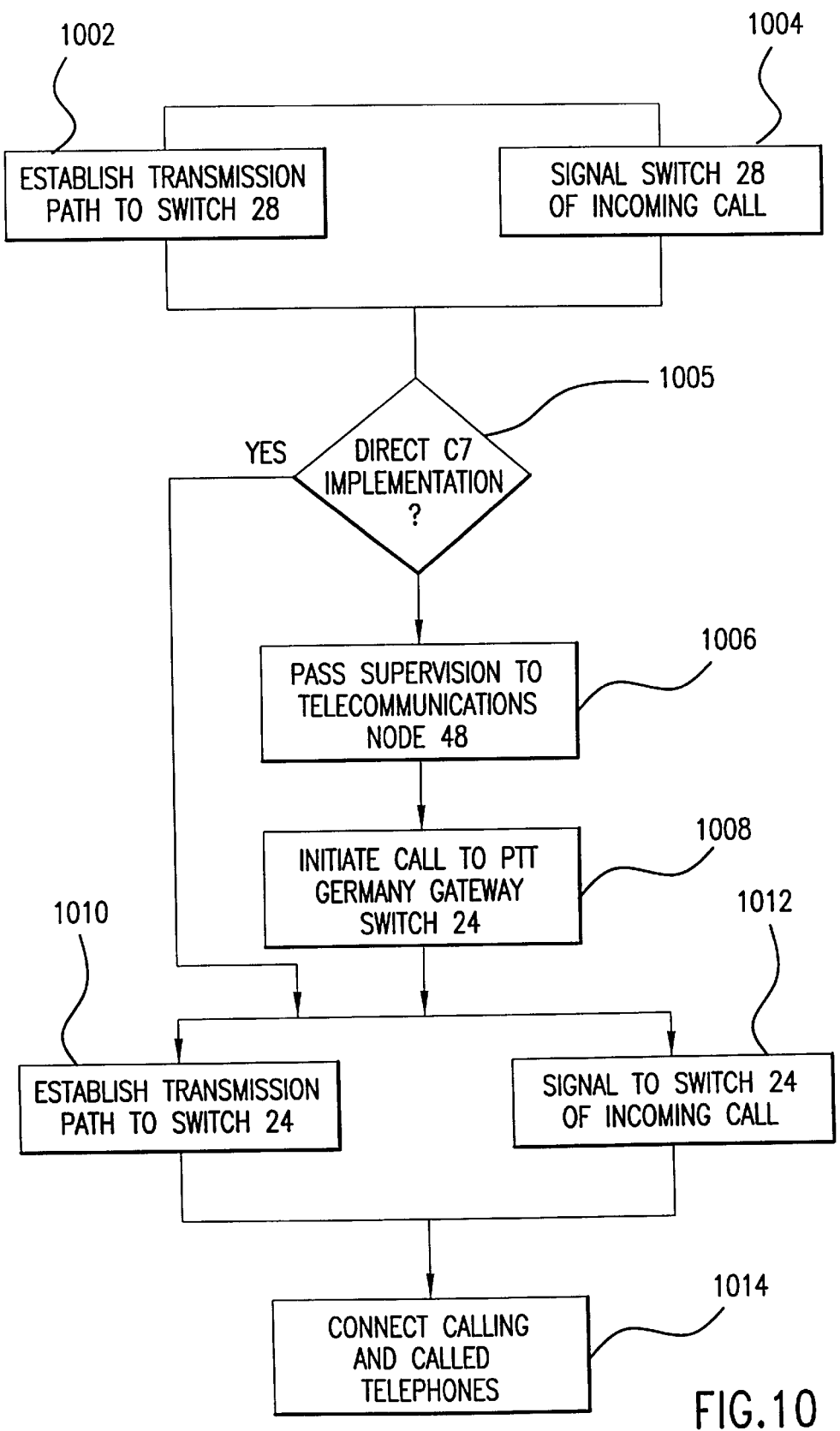
FIG. 10 is a flowchart depicting in greater detail a third portion of the call-routing operation depicted in FIG. 7.

The system then proceeds to step 1002 of the flowchart depicted in FIG. 10. In step 1002, AT&T's international gateway switch 22 establishes a transmission path to carry the call to international gateway switch 28 based on instructions from telecommunications node 44 regarding routing, signaling, the appropriate port with which to connect, and the destination number to employ. Concurrently, in step 1004, telecommunications node 44 transmits an SS7 (or C7 or other appropriate protocol) message to international gateway switch 28 via line 34.

The C7 message comprises a code which informs international gateway switch 28 that the call is not for termination in the U.K. (i.e., that the call is a transit call), and instructs switch 28 to pass supervision of the call to telecommunications node 48.

The particular C7 code used to inform international gateway switch 28 that the call is a transit call is unimportant as long as the gateway switch is configured to recognize the C7 code as indicating a transit call. For example, the originating gateway switch (under the control of telecommunications node 44) may send both call and signaling to the transit gateway switch, which will recognize the dial string as terminating elsewhere, and hence behave as a transit gateway switch.

With the trend towards deregulation, competition for services such as call completion would enable multiple, competing international gateway switches to terminate phone calls. Where this is the case, international gateway switch 28 will not be able to parse the dialed telephone number to derive the unique address of the intended terminating international gateway switch, which is one specific gateway out of multiple alternative options.

One way to address a specific country gateway switch is to enrich the addressing of country codes for this purpose. When international gateway switch 28 sees the enriched country code (dictated by telecommunications node 44), it immediately recognizes the call as a transit call to one specific gateway switch of several optional international gateway switches in Germany.

Another alternative is to insert a flag anywhere in the signaling stream that would force the transit gateway switch to pass supervision to telecommunications node 48 for routing instructions. A further alternative is to define a new class of service code, which may be transmitted as part of the C7 message.

Also, some telecommunications nodes may acquire a C7 point code, thus permitting a gateway switch to direct traffic to the node where this may be advantageous (e.g., for re-origination). Where C7 permits direct communication between transit gateway switch 28 and the German gateway switch 24, step 1005 depicts that capability. Otherwise, (e.g., when there may be more than a single gateway option for completing the call in Germany) the system proceeds to step 1006. In step 1006, international gateway switch 28 passes supervision of the call to telecommunications node 48, which had been informed (through signaling over line 62 or using C7 signaling) by server node 56 of the call's route to Germany. In step 1008, telecommunications node 48 signals to international gateway switch 28 an instruction to complete the call to the telephone number of called telephone 4 in Germany.

In step 1010, international gateway switch 28 establishes a transmission path to carry the call to Germany's international gateway switch 24. Concurrently, in step 1012, international gateway switch 28 transmits a C7 signaling message to international gateway switch 24 informing switch 24 of an incoming call for termination in Germany. In step 1014, international gateway switch 24 routes the call through terminating toll switch 18 and local network 10 to called telephone 4, thus establishing a connection between the calling party and the called party.

When a call is terminated, every participating telecommunications node in the routing path transmits a data message to server node 56 containing the details of the call, including the duration of the call and other price-affecting parameters (e.g., quality). Server node 56 uses this information to credit account balances for every service provider who participated in the routing path, and debit the account of the service requester.

While the invention has been described in conjunction with specific embodiments, it is evident that numerous alternatives, modifications, and variations will be apparent to those skilled in the art in light of the foregoing description. For example, the recent availability of circuits on a specific route may be used as an indication that circuits on the route are presently available. In that case, instead of specifying a circuit number, the telecommunications node may signal to its associated international gateway switch an instruction to complete the call. If all circuits on the selected route are busy at the time the call is attempted (which is some short interval after the availability of the circuit was initially probed), the caller hears an appropriate announcement. Another alternative would enable a telecommunications node (when probed by the server node for circuit availability) to seize the circuit. The actual call will have to arrive within a standard, short interval or else the seized circuit will be released.

As noted in my copending application Ser. No. 08/811,071, the speed of the system may be increased by synchronizing the concurrent establishment of two or more calling legs in a routing path. Thus, in the illustrative example given above, several of the steps might be performed in parallel such as establishing transmission paths from the U.S. to the U.K. and from the U.K. to Germany, in order to increase the speed of the system. For example, upon receiving a request or instruction to route a call, the U.K. node may verify that trunks are available to transmit the call to Germany, and that the destination, such as called phone 4, is available (on-hook).

It should be noted that when the gateway switches described above are IN compatible, server node 56 is aware of this fact and informs telecommunications node 44. Telecommunications node 44 may then interact directly with the U.K. gateway switch using IN signaling rather than SS7 or C7. In this event, telecommunications node 44 need not interact with U.K. telecommunications node 48. Moreover, if gateway switch 24 is also IN compatible, telecommunications node 44 may employ IN signaling to communicate directly with gateway switch 24 to determine, for example, whether called telephone 4 is off-hook.

More generally, when the present disclosure is taken in combination with my copending application Ser. No. 08/728,670, which is hereby incorporated herein by reference in its entirety, it will be recognized that the present invention employs data lines to provide data signaling external to the telecommunications network in order to facilitate the efficient routing of calls. As will be recognized, the degree to which external data signaling is required will depend on the ability of the telecommunications network's signaling capability to carry the data messages necessary to interoperate with the overlay network of the present invention.

In the first illustrative example described above, a service requester purchased (block-reserved) connect time. The global network can also satisfy call-routing requests on a call-by-call basis for carriers who have not reserved capacity on the relevant route or when bulk-reserved circuits are not available. A second example, which illustrates such a transaction will now be described in connection with FIGS. 11A–B.

Figure 11A:
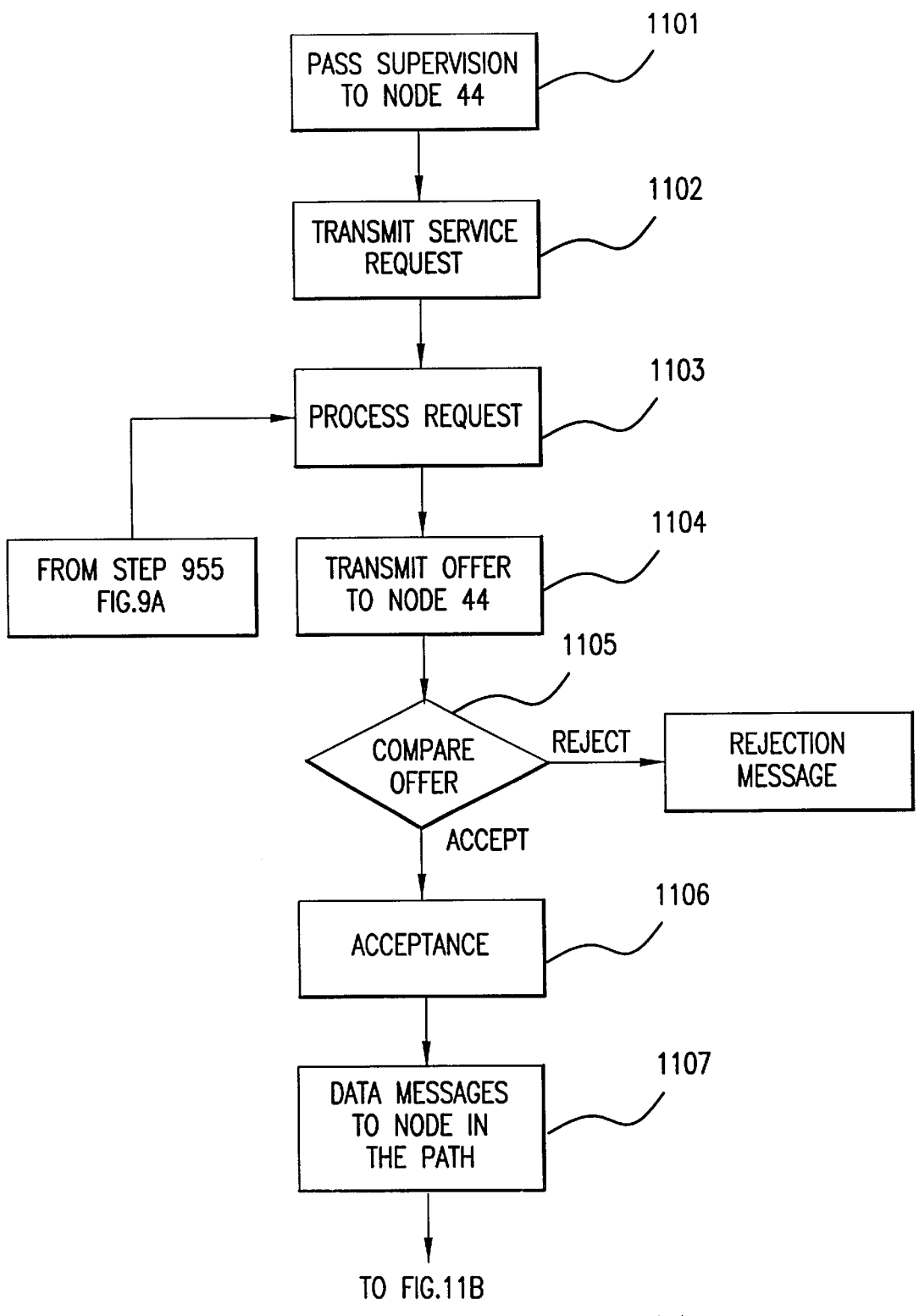
FIG. 11A–B are a flowchart of a protocol for purchasing connect time on a transaction-by-transaction basis.
Figure 11B:
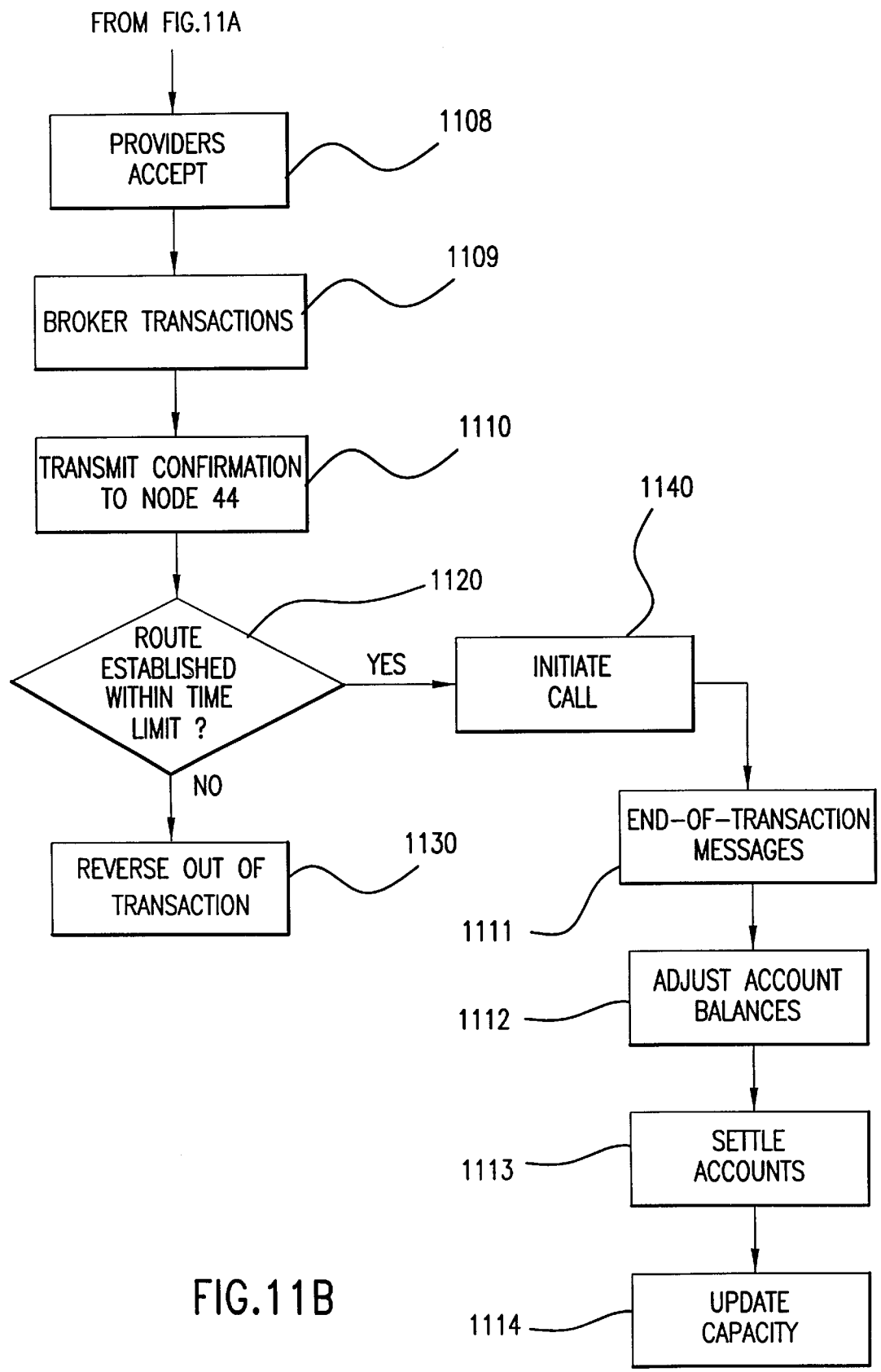

As shown in FIGS. 11A–B, the system employs a multi-step protocol to clear a call-by-call connection transaction. In step 1101, when a call is received at gateway switch 22, the switch passes supervision of the call to telecommunications node 44. In step 1102, telecommunications node 44 transmits a call-routing request to at least one server node 56, and triggers an interval timer; the timer will be used by telecommunications node 44 to return call supervision to gateway switch 22 if the global network cannot provide a suitable circuit within an acceptable time interval, as described below. For purposes of this illustrative example, it will be assumed that telecommunications node 44 transmits a request to only one server node 56. As explained in greater detail below, however, telecommunications node 44 may transmit a service request to a plurality of server nodes 56 (co-located or distributed), each of which may be optimized for a different parameter, such as price or network utilization.

Figure 9B:
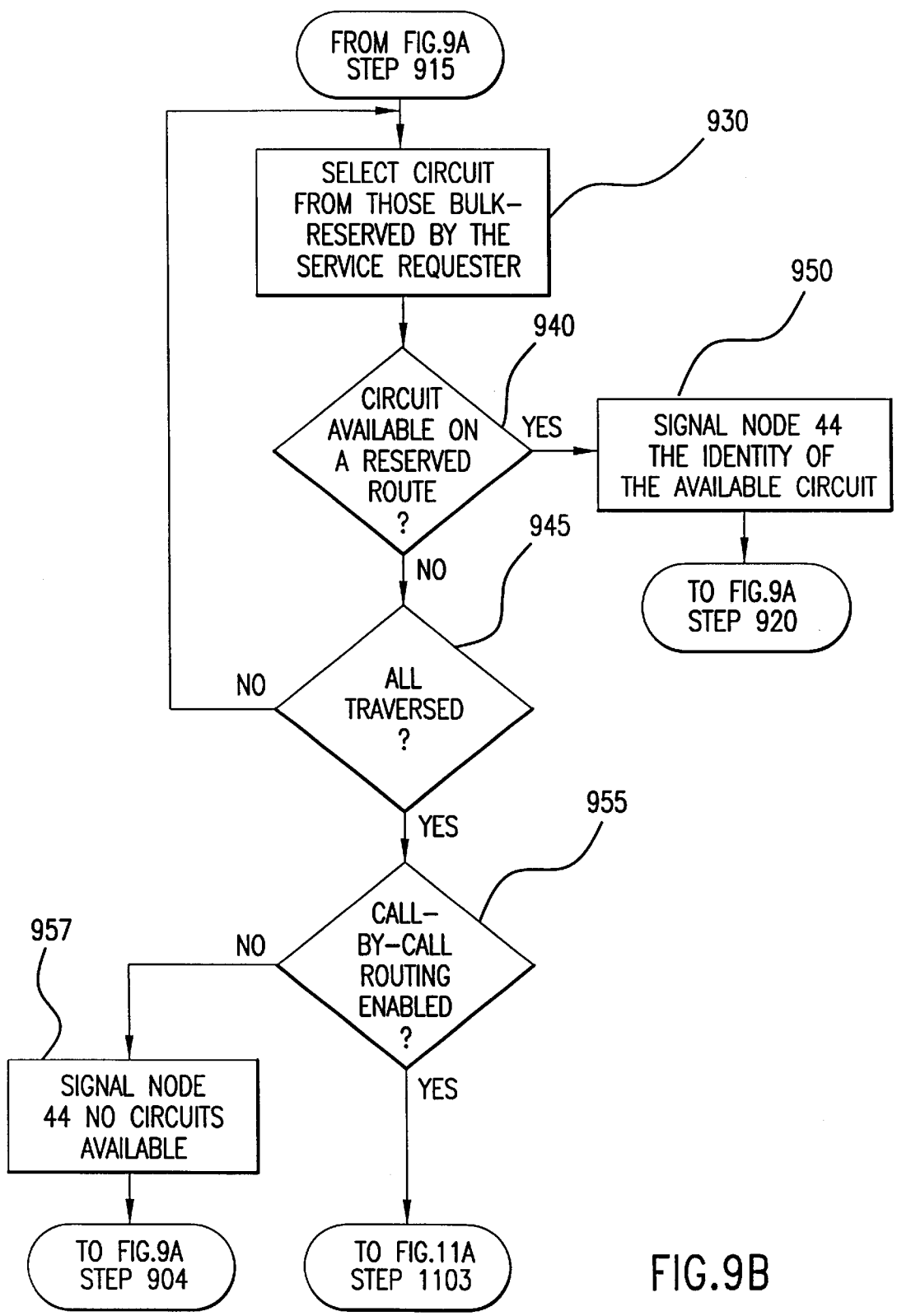

In step 1103, server node 56 processes the request and identifies the routing path which best meets the requirements of the requesting node given the optimization priorities of server node 56. For example, assuming that server node 56 is programmed to optimize routes by price, server node 56 would identify the least expensive routing path which meets the service parameter requirements of telecommunications node 44. Note that step 1103 and the remaining process is also executed for service requesters who had reserved capacity, yet choose to avail themselves of the call-by-call routing service under certain circumstances (as depicted in FIG. 9B step 955).

In step 1104, server node 56 transmits an offer of service to telecommunications node 44 comprising the particulars of the identified route.

In decision step 1105, telecommunications node 44 compares the offer to other potential routes which might be employed to connect the call from calling telephone 2 to called telephone 4. This determination may be based on sophisticated business rules supplied to telecommunications node 44 by the service requester. For example, as noted above in connection with FIG. 1B, telecommunications node 44 is provided with a network cost database which stores the carrier's internal cost of connecting a call from gateway switch 22 to the called location. Telecommunications node 44 might be programmed to accept the offer from server node 56 only if it is 10% less expensive than the network's own internal cost of completing the call.

If decision step 1105 fails, telecommunications node 44 transmits a rejection message to server node 56. This ends the protocol.

Otherwise, if decision step 1105 succeeds, the system proceeds to step 1106 where telecommunications node 44 transmits an acceptance to server node 56.

In step 1107, server node 56 transmits data messages to every node in the routing path requesting service to connect the call. In step 1108, the nodes in the path agree to provide the service, and transmit a data message to server node 56 to that effect.

In step 1109, server node 56 brokers the financial transactions resulting from establishment of the routing path. As part of step 1109, server node 56 reserves a portion of the service requester's credit limit to cover the cost of the call. The reserved dollar amount is chosen based on an estimate of how long the call will last. This estimate may be based on historical call lengths.

In step 1110, server node 56 transmits a confirmation message to telecommunications node 44, confirming purchase of connect time on the identified routing path. The message also preferably comprises information concerning the port on gateway switch 22 via which the call is to be routed, as well as destination numbers and other service data necessary to complete the call to the called location.

In decision step 1120, telecommunications node 44 compares the time elapsed from the initial call-routing request to the present, and rejects the resulting confirmation if the elapsed time exceeds the established maximum. Note that telecommunications node 44 returns supervision to gateway switch 22 when the max time has expired, not waiting for the aforementioned confirmation; hence, when the telecommunications node rejects the confirmation, the call is already being established independently of the global network.

In step 1130, service node 56 reverses all the transactions leading to the aforementioned confirmation, and resets all associated financial changes.

In step 1140, if the confirmation was received within the allotted time, the call is initiated following the established route (as previously described in relation to FIG. 10).

In step 1111, at the conclusion of the call, each node in the routing path transmits an end-of-transaction message (which may preferably include the length of the call) to server node 56.

In step 1112, server node 56 adjusts the account balances of all service providers and node operators participating in the routing to reflect the cost of the call. In step 1113, server node 56 settles the accounts of all carriers, trader accounts, and node operators by transmitting payment to parties with positive balances and bills to parties with negative balances. Step 1113 may be performed periodically, e.g., monthly.

In step 1114, server node 56 updates capacity to reflect that ports that had been employed to carry the call are now clear and records the number of minutes of network time that were used to carry the call.

The nodes may also provide routing decisions based on sophisticated business considerations submitted by a service requester to its local node. Assume, for example, that a service requester only wishes to buy connect time via the global network if the cost is below 80% of its own cost unless it needs the connect time for overflow traffic. This business consideration can be transmitted to its local node which will evaluate routes proposed by server node 56 in accordance with the transmitted business considerations. Server node 56, however, will generally not have access to these proprietary business considerations, unless the system is a closed network where node 56 is employed to optimize capacity, rather than price, as described, for example, below.

As noted, in the above-described embodiments originating telecommunications node 44 was shown to communicate with server node 56, which constituted a single source of rate information and a single exchange for telecommunications capacity. In other embodiments, however, several server nodes may be used, which communicate with telecommunications node 44 in the same or similar way as discussed above. Server nodes may be collocated or geographically distributed. In such another embodiment each telecommunications node 44–49 would be connected to one or multiple server nodes.

In a multiple server-node embodiment, each server node 56 may rank potential routing paths in accordance with a particular parameter or set of parameters. For example, some server nodes may rank routes by price. Other server nodes may rank routes in a manner designed to maximize network utilization. A given service provider may offer its telecommunication capacity on one server node or on multiple server nodes. Because each server node may rank routes according to different priorities, a particular service query from an originating node might yield different proposed routes from each of the server nodes 56.

Consequently, an originating node, such as telecommunications node 44, connected to multiple server nodes 56 must store selection rules for determining which route to choose from among the several that may be proposed by the different server nodes 56. The decision in selecting a server node may depend on various business factors and conditions specific to a service requester. For example some service requesters may first transact business with server nodes having lower transaction surcharge, while others may prefer server nodes that are known for availability of high volumes of connect time for sale.

A person skilled in the art will understand that a specific selection of choices may be programmed based on a carrier's specific business needs. For example certain carriers might have an affiliation or a special volume discount with a company providing telecommunication capacity which is available on only one specific server node. In such a case, the service requester might first attempt to purchase telecommunication capacity from the specific server node, which offers the affiliated company's connections before purchasing capacity on other server nodes. In another example, the service requester might prefer to purchase connect time from a server node with which it is affiliated, unless the price offered by that server node is, e.g., 10% greater than the price available from a second server node with which the carrier has no affiliation. Telecommunications node 44 is programmed to implement these business rules supplied to it by the service requester.

The present invention also permits a carrier who owns or is associated with a telecommunications node 44–49 to dynamically control its capacity in accordance with a set of business rules. With respect to this aspect of the invention, if a telecommunications node receives a volume of calls that exceeds or is close to the limit of its previously purchased connection capacity to a given destination, the telecommunications node can contact server node 56 with a request to purchase additional minutes of connect time to accommodate this unforeseen demand. Additional capacity may either be requested automatically when a call volume reaches a specified threshold or by a system operator who monitors telecommunication traffic conditions.

Furthermore, a node may include a capability to adjust its resources based on the actual and anticipated telecommunication traffic conditions. It is known to keep track of call traffic volume to a given destination and to store measurements of the call volume periodically in a resource utilization database. Such data representing network utilization coupled with other variables, such as time of the day and day of the week, may provide a basis for a reasonable prediction of the capacity utilization during the next time interval, for example the next hour.

Then, if anticipated utilization exceeds a desired utilization level, the node would purchase additional capacity, e.g. connect time to a destination, for the next time interval. Conversely if the predicted utilization is lower than desired, the node would offer excess minutes during the next time period for sale.

For example, if the desired utilization is 80% of the purchased capacity, a node will purchase or sell capacity so as to adjust anticipated utilization to 80%.

Figure 12:
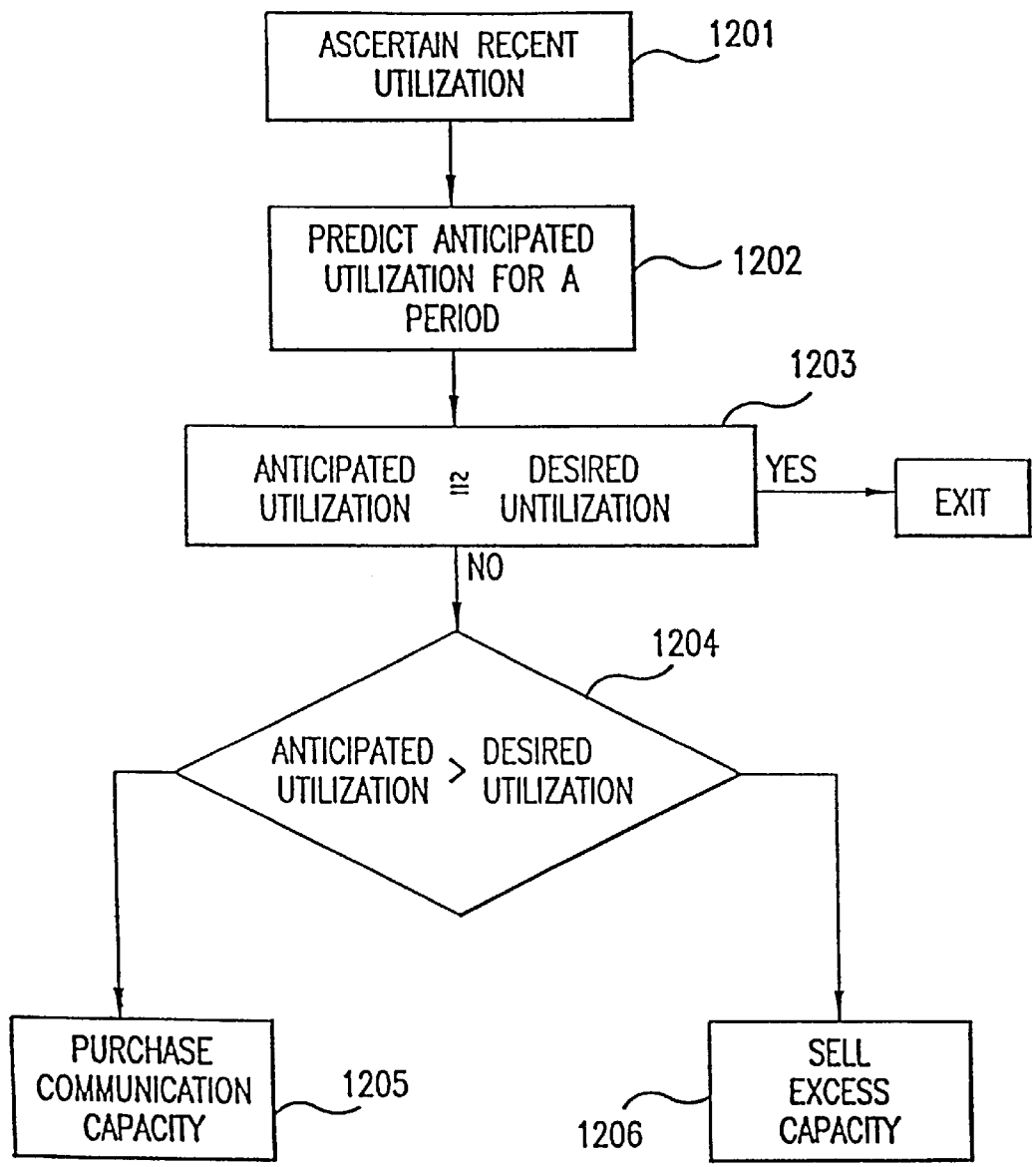
FIG. 12 is a flowchart depicting dynamic control of available telecommunication capacity by a telecommunications node.

FIG. 12 illustrates a flowchart of this functionality. At 1201 the system ascertains recent utilization by referring to the utilization database and at 1202 predicts, based on recent utilization and other factors such as time of the day and day of the week, the anticipated utilization for the next period, e.g., an hour. At 1203, if the anticipated utilization for a period is approximately the same as the desired utilization, this execution terminates until the next period. (Of course, as discussed before, if volume rises unexpectedly the node should react to such a situation and purchase additional capacity automatically or upon operator's instruction).

If anticipated utilization materially deviates from the desired utilization (test 1204), the node proceeds to purchase or sell capacity for the next period accordingly. If utilization is predicted to exceed the desired utilization, at 1205 the node purchases additional capacity so that the anticipated utilization is at the desired level. Similarly if utilization is predicted to be lower than desired, at 1206 the system sells excess capacity to bring anticipated utilization to the desired level.

The desired utilization may take the form of a formula which incorporates business considerations. As a simple example, the node may be instructed to maintain utilization at 80% of capacity unless purchase of additional connect time is above a certain price, or sale of excess connect time is below a certain price. The business rules applied by the node may be substantially more sophisticated than the example described above, and may take into account any factor desired by carriers (requesters and/or providers).

In a preferred embodiment the system is capable of displaying market-price information to prospective sellers and buyers of connection time. As described below, display of market-price information may preferably be in the form of a streaming banner generated by a Java applet running on a client-PC located at the customer. In other embodiments, the information to be displayed may be in another form and/or displayed on another display device, as known in the art.

Figure 13:
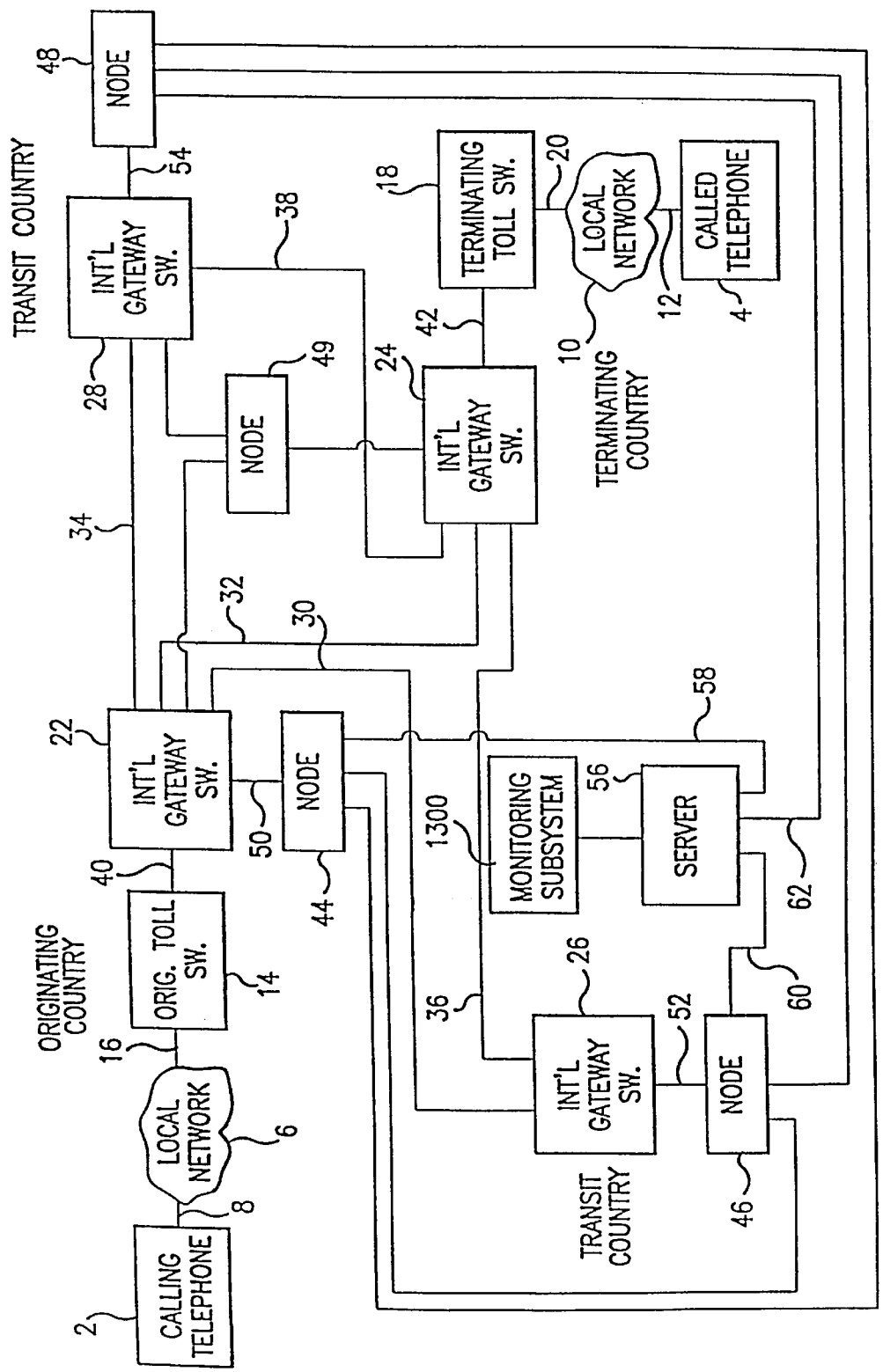
FIG. 13 is a block diagram of a telephone system architecture comprising a market-price monitoring subsystem.

As shown in FIG. 13, in this preferred embodiment, the system architecture shown in FIG. 1A is preferably further provided with a market-price monitoring subsystem 1300. The structure and operation of market-price monitoring subsystem 1300 is described in connection with FIGS. 14–18.

Figure 14:
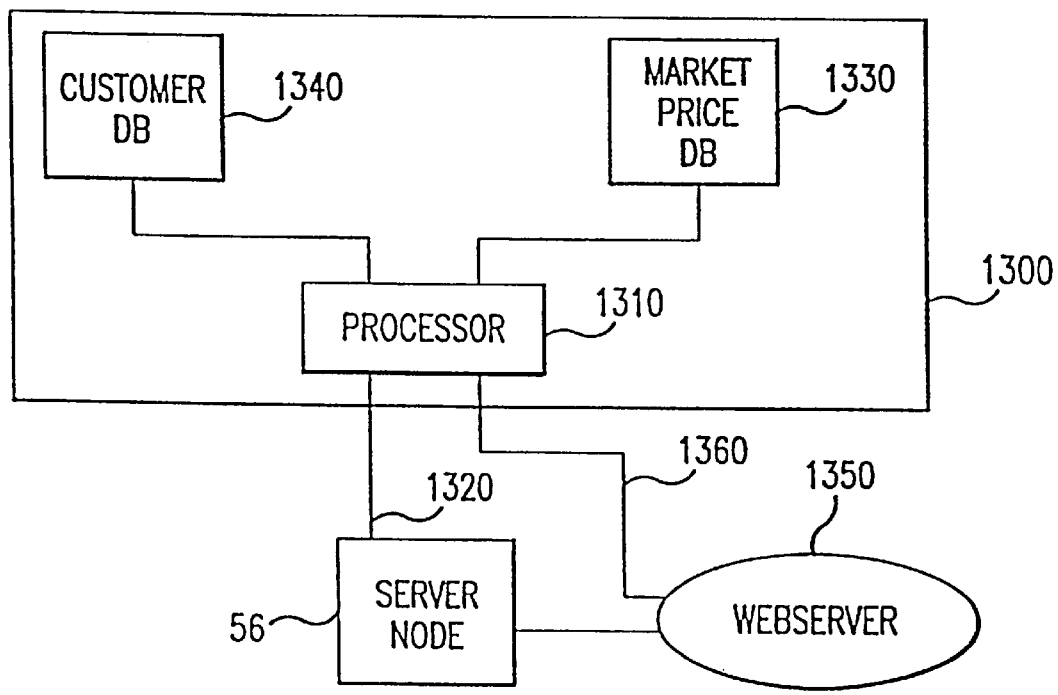
FIG. 14 is a block diagram of a preferred embodiment of the market-price monitoring subsystem.

As shown in FIG. 14, market-price monitoring subsystem 1300 preferably comprises a processor 1310 that is connected to server node 56 via a communication link 1320. In addition, market-price monitoring subsystem 1300 further comprises a market-price database 1330 and a customer database 1340. As explained in more detail below, market-price database 1330 stores information regarding the market price of the telecommunication routes managed by server node 56. Customer database 1340 maintains a list of routes that are of interest to particular customers so that display of market-price information may be customized for each customer. Subsystem 1300 is connected to webserver 1350 via a communication link 1360. Webserver 1350 is connected to server node 56 by a communication link 1325. Communication links 1320, 1325, and 1360 may be realized via the internet.

A preferred embodiment of a portion of market-price database 1330 is shown in FIG. 15. As shown in FIG. 15, market-price database 1330 preferably comprises an entry 1510 for each telecommunications route via which service is offered by server node 56. In a preferred embodiment, a route may be defined by the geographic locations it connects, the defined levels of quality and service it guarantees, and the time of day during which the connection time may be utilized. Alternatively, a route may be defined by additional, fewer, or other groups of parameters. Illustratively, the table may contain fields for the days of the week on which the connection time may be utilized, and the time-period during which the connection time may be utilized (e.g., Sep. 1 through Nov. 30, 1998). In addition, the table may comprise an additional field storing the quantity of connection time for the defined route that is available for purchase. Thus, as shown for example in FIG. 15, market-price database 1330 may comprise separate entries 1510 for distinct routes connecting the United States and Germany, including, for example, a first route offering an "A" quality level and an "A" security level between the hours of 1 PM and 7 PM Greenwich Mean Time, and a second route offering an "A" quality level and a "B" security level between the hours of 7 PM and 1 AM Greenwich Mean Time. For each such entry, market-price database 1330 stores a unique identifier 1520 and a price 1530 calculated by processor 1310 as constituting the market price for the route. As described below, processor 1310 may employ one of several techniques to determine market price.

A preferred embodiment of a portion of customer database 1340 is shown in FIG. 16. As shown in FIG. 16, customer database 1340 comprises entries 1610 for various customers of the system who buy or sell telecommunication time via server node 56. For each customer having an entry, customer database 1340 stores one or more routes that may be of interest to customer. For example, the routes of interest may be those that directly impact the customer or a subset of buyers and sellers of interest to the customer. The routes stored for each customer may be determined by historical purchasing patterns of the customer. Alternatively, the customer may be permitted to choose routes of interest to the customer when it logs onto webserver 1350. Thus, for example, customer "Austria Telecom" may be particularly interested in voice quality, high security routings between France and Austria and between Germany and Austria. In that event, customer database 1340 would store identifiers 6435 and 6908, representative of those routes of interest, as part of the Austria Telecom entry of customer database 1340.

In addition, database 1340 preferably comprises one or more default entries 1620 for storing route identifiers representative of routes to be displayed to customers or potential customers of the system who do not have entries in customer database 1340. In a preferred embodiment, each default entry may be associated with a particular location so that the default routes displayed to a customer who does not have an entry in customer database 1340 may be chosen based on the customer's location, as described below. In an alternative preferred embodiment, the default displays may focus (at the customer's option) on trends in trading activities that are of interest to the customer such as routes that are experiencing significant volatility in price and/or large trading volumes.

In operation, processor 1310 monitors all transactions brokered by server node 56 and, on the basis of these monitored transactions, determines a market price for each defined route stored in market-price database 1330. As noted, processor 1310 may use one of several methods to determine market price. In a preferred embodiment, market price for a route may be determined as the price paid for the most recent transaction comprising the parameters that define the route (e.g., geographic route, quality, security, etc.). Each time processor 1310 detects a transaction brokered by server node 56, it updates the market price stored for the route in market-price database 1330. Alternatively, market price for a route may be computed as the average price of transactions for the route that have been brokered by server node 56 over the past hour, or other time period.

When a customer or potential customer logs on to webserver 1350, webserver 1350 and market-price monitoring subsystem 1300 cooperate to display to the customer up-to-date market information concerning a selection of the routes maintained by server node 56, as will now be described in connection with FIGS. 17–18.

Figure 17A:
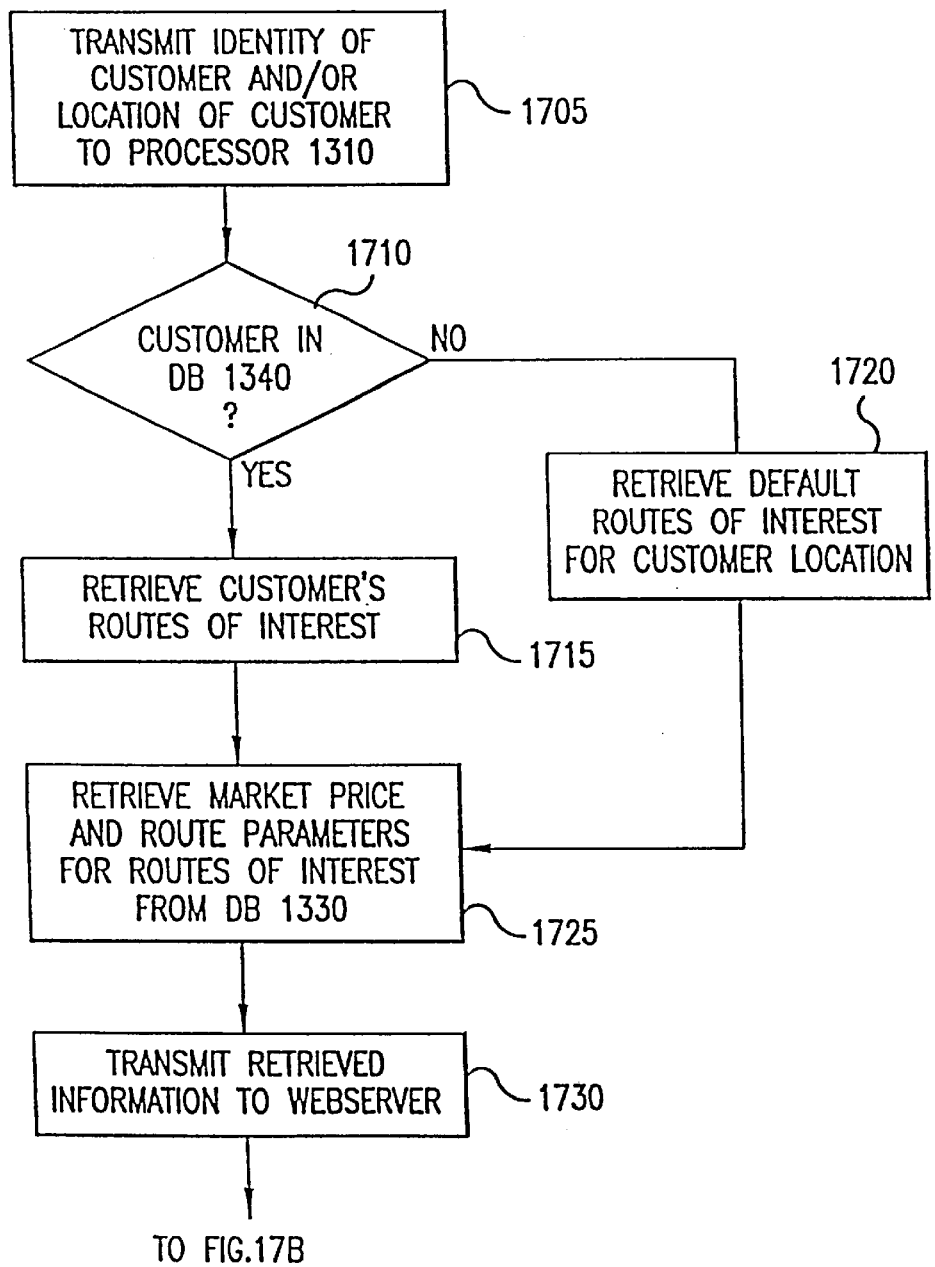
FIGS. 17A–B are a flowchart depicting an aspect of the operation of the market-price monitoring subsystem.
Figure 17B:
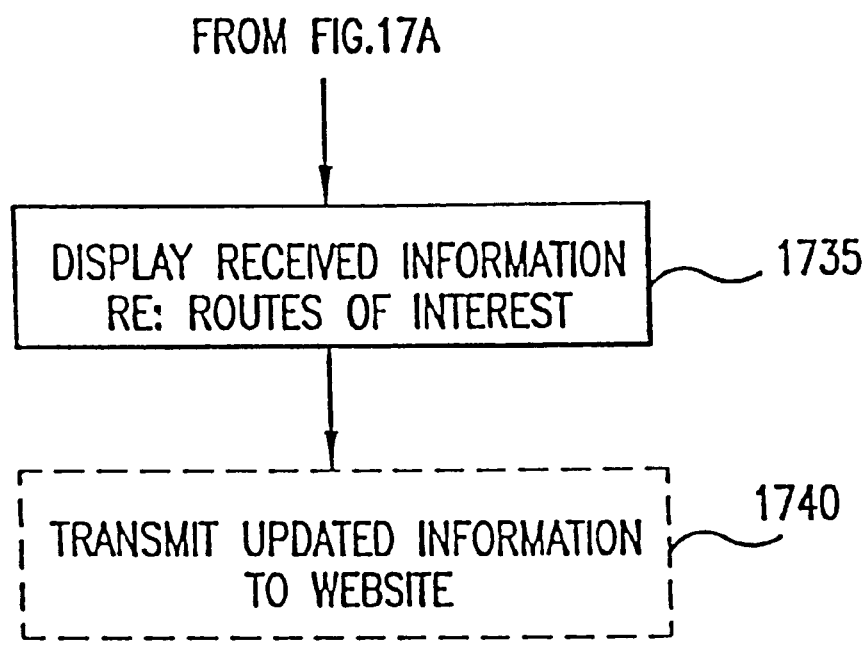

As shown in FIG. 17, in step 1705, when a customer logs on to webserver 1350, the webserver transmits a data message to processor 1310 preferably comprising the identity of the customer and/or the customer's location. In step 1710, processor 1310 searches customer database 1340 to determine whether the customer has an entry in the database. If the customer has an entry, processor 1310 retrieves from memory the route identifiers for the routes that are of interest to the customer (step 1715). Otherwise, processor 1310 retrieves from memory the route identifiers from the default entry associated with the customer's location or other default entry that may be based, e.g., on the customer's interest in particular trading trends, as described above (step 1720). Alternatively, the information concerning routes of interest to the customer may be stored in a cookie placed by the webserver in the browser of the customer's client-PC.

In step 1725, processor 1310 retrieves from market-price database 1330 the market price and route parameters (e.g., geographic route, quality level, security level, and time of day) for the identified routes, and in step 1730, transmits that information to webserver 1350 via communication link 1360. In step 1735, webserver 1350 causes to be displayed on the client-PC the received information concerning the routes of interest to the customer. Alternatively, a portion of the received information, relating to a subset of the parameters defining the route, may be displayed. The subset of parameters to be displayed may be defined by the customer.

In a preferred embodiment, the market-price information is displayed to the customer in the form of a streaming banner generated, e.g., by a Java applet or other software running on the client-PC or directly on webserver 1350. An illustrative example of a webpage comprising such a streaming banner is shown in FIG. 18. If desired, the streaming banner may have a height of two or more lines in order to increase the amount of information displayed simultaneously to the customer.

In a preferred embodiment, as shown in step 1740, if the price of a displayed route changes while the customer remains on-line, processor 1310 transmits updated market-price information to webserver 1350 which communicates with the Java applet on the client-PC to update the appropriate entry within the streaming banner.

In a preferred embodiment, the customer may conveniently purchase connection time on one of the displayed routes by clicking on the displayed information. In that event, the system directly prompts the customer with a template or other graphical interface to permit the user to enter the amount of time to be bought or sold, the asking price, etc. The system then proceeds to attempt to broker a transaction to buy or sell the desired connection time, as described above.

While the invention has been described in conjunction with specific embodiments, it is evident that numerous alternatives, modifications, and variations will be apparent to those skilled in the art in light of the foregoing description.

For example, although illustrated primarily in connection with international telephone calls, the present invention may also be applied to improve the efficiency of a network located within one country.

Also, although illustrated primarily in connection with a public network comprised of a plurality of carriers, the present invention may also be employed to efficiently manage a private network, or a network made up of facilities maintained by affiliated carriers. In this context, server node 56 will frequently be programmed to rank routing paths according to a parameter other than simple price. For example, the network may rank and allocate routes in a manner designed to maximize utilization of the network facilities.

What is claimed is:

1. A method for trading telecommunications services, comprising:

receiving service offers from a plurality of sellers, each seller having an account stored in a memory, each account having a balance, each service offer constituting an offer to sell a block of telecommunications connect time larger in size than a single telecommunications transaction for a route connecting a pair of locations in a network, each service offer comprising a plurality of parameters, the parameters comprising:
a price;
an origination location; and
a destination location;

identifying one or more routes for routing calls from a first location to a second location using the received service offers, each of the identified routes comprising one or more calling legs, service for each calling leg being provided by a service provider;

receiving service requests from a plurality of buyers, each buyer having an account stored in a memory, each account having a balance, each service request requesting purchase of a block of telecommunications connect time larger in size than a single telecommunications transaction, each service request comprising a plurality of parameters, the parameters comprising:
a price;
an origination location; and
a termination location;

matching service requests provided by buyers to at least a portion of one or more service requests provided by sellers;

brokering a transaction that effects a transfer of ownership of at least a portion of the telecommunications connect time specified in the matched service offers from each seller to a respective buyer; and updating the account balance of each seller and buyer of telecommunications connect time.

2. The method of claim 1, wherein the buyers are chosen in accordance with a rule or set of rules.

3. The method of claim 2, wherein the rule is first-come-first-served.

4. The method of claim 2, wherein the rule is an auction between all service requests received within a predetermined window of time.

5. The method of claim 4, wherein the auction is a Vickrey style auction.

6. The method of claim 4, wherein the auction matches all service requests received through a specific point in time with all service offers received through that same point in time, including requests and offers already matched in previous auctions.

7. The method of claim 2, wherein the rule is an auction that matches all service requests received within a predetermined window of time with all available service offers.

8. The method of claim 2, wherein the rule is designed to maximize the amount of communication services sold in response to a plurality of requests received within a predetermined amount of time.

9. The method of claim 1, wherein at least one seller is a person or entity that does not possess telecommunication transmission facilities capable of providing the offered service.

10. The method of claim 1, wherein a single entity may act as both a buyer and a seller of telecommunication services.

11. The method of claim 10, wherein at least some of the telecommunication service offered for sale is service that had previously been purchased by the seller.

12. The method of claim 10 wherein the entity is in possession of a computer system adapted to dynamically monitor market trends and sell or buy telecommunication services on the basis of expected supply and demand for such services.

13. The method of claim 1, wherein statements are periodically transmitted to each seller and buyer.

14. The method of claim 13, wherein the statements are made available for buyer and seller online perusal.

15. The method of claim 14, wherein the online perusal is via the world wide web.

16. The method of claim 1, telecommunication status and account status information are periodically transmitted to each seller and buyer.

17. The method of claim 16, wherein the status information is made available for buyer and seller online perusal.

18. The method of claim 17, wherein the online perusal is via the world wide web.

19. The method of claim 1, wherein the ability of carriers to provide telecommunication services offered for sale is authenticated.

20. The method of claim 19, wherein the authentication is based at least in part on the carriers' historical performance.

21. The method of claim 19, wherein carrier ratings are maintained.

22. The method of claim 20, wherein the carrier ratings are maintained adaptively, based on a smoothed average of measurements taken over time.

23. The method of claim 20, wherein the carrier ratings are based on the ability of carriers to provide offered services.

24. The method of claim 1, wherein the step of brokering is performed by an entity that assures the ability of carriers and other participants to meet the financial commitments implied by their purchasing activities.

25. The method of claim 1, wherein the step of brokering is performed by a clearing node, further comprising:

at a telecommunications node, comparing the cost and availability for connecting a telecommunication transaction using telecommunication service purchased via the clearing node to the cost of connecting the telecommunication transaction via an alternate means and determining whether the transaction should be connected using telecommunication service purchased via the clearing node or using an alternate means.

26. The method of claim 25, wherein status information on trading activities is available to buyers and sellers.

27. The method of claim 26, wherein the status information provided is limited to information directly impacting a subset of buyers and sellers.

28. The method of claim 26, wherein the status information is provided for online perusal by buyers and sellers.

29. The method of claim 28, wherein the online perusal is via the world wide web.

30. The method of claim 25, further comprising determining that the transaction should be connected using telecommunication service purchased via the clearing node if the cost of doing so is less than a predetermined percentage of the cost of connecting the transaction via alternate means.

31. The method of claim 25, further comprising determining that the transaction should be connected using telecommunication service purchased via the clearing node on the basis of business considerations.

32. The method of claim 31 wherein the clearing node is not privy to the business considerations.

33. The method of claim 25, wherein the telecommunications node determines that the transaction should be connected using telecommunication service purchased via the clearing node when no alternative means for carrying the call is available.

34. The method of claim 25, further comprising a plurality of clearing nodes, wherein each clearing node brokers transactions so as to optimize for at least one parameter.

35. The method of claim 34, wherein each clearing node brokers transactions so as to optimize for a distinct parameter.

36. The method of claim 34, wherein one of the parameters is price.

37. The method of claim 34, wherein one of the parameters is network utilization.

38. The method of claim 34, wherein the telecommunications node stores one or more selection rules for determining the service offer to accept from among a plurality of service offers proposed by the plurality of clearing nodes.

39. The method of claim 38, wherein the set of selection rules is a function of at least one of the following: affiliations between the buyer and one or more of the clearing nodes; bandwidth/time volumes available from one or more of the clearing nodes; volume discounts available from one or more of the clearing nodes; or transaction charges imposed by one or more of the clearing nodes.

40. The method of claim 25, wherein the telecommunication node is adapted to:
predict on the basis of a plurality of factors the anticipated demand for services via a telecommunications switch for an upcoming predetermined period of time;
compare the anticipated demand to the communication services available for the predetermined period of time to the telecommunications switch;
purchase communications services via the clearing node when the comparison indicates that the anticipated demand exceeds the available communication services for the predetermined period of time; and
sell communications services via the clearing node when the comparison indicates that the anticipated demand is less than the available communication services for the predetermined period of time.

41. The method of claim 40, wherein the prediction is based at least in part on recent utilization patterns for the telecommunication switch.

42. The method of claim 40, wherein the decision to sell or purchase communication services is additionally a function of a set of predefined rules.

43. The method of claim 25, further comprising a plurality of telecommunications nodes, wherein the telecommunications nodes and the clearing node comprise an overlay network over a distinct communications network.

44. The method of claim 43, wherein the telecommunication nodes may communicate directly with elements of the distinct communications network using IN signaling.

45. The method of claim 25, wherein the telecommunications node comprises a first database that stores the cost to a carrier of connecting a call from an originating location to a terminating location.

46. The method of claim 25, wherein the telecommunications node comprises a second database that stores the price published by a service provider offering to connect an originating location to a terminating location.

47. The method of claim 25, wherein the telecommunications node comprises a third database that stores a map of the physical transmission facilities maintained by a communications provider, the technologies supported by the facilities, and the names and locations of other carriers with which the carrier's facilities interconnect.

48. The method of claim 25, wherein rate tables are used to periodically update routing tables located at one or more telecommunication switches.

49. The method of claim 1, further comprising:
an IN compatible telecommunications switch;
a telecommunications node associated with the telecommunication switch;
wherein the telecommunications node is adapted to cause an IN signal to be transmitted by the telecommunications switch to a second switch in a route of a telecommunication transaction, the content of the IN signal informing the second switch that the telecommunication is not for termination in the location of the second switch.

50. The method of claim 1, further comprising:
an SS7 compatible telecommunications switch;
a telecommunication node associated with the telecommunication switch;
wherein the telecommunications node is adapted to cause an SS7 signal to be transmitted by the telecommunications switch to a second switch in a route of a telecommunication transaction, the content of the SS7 signal informing the second switch that the telecommunication is not for termination in the location of the second switch.

51. The method of claim 1, wherein the step of brokering is performed by a clearing node comprising a distributed network of computers.

52. The method of claim 51, wherein the distributed computers are associated with telecommunications nodes.

53. The method of claim 1, wherein the step of brokering may be performed by any one of a plurality of clearing nodes, wherein each clearing node employs a subset of matching criteria for determining clearing activities.

54. The method of claim 53, wherein a separate computer adjudicates a single clearing result from the plurality of results offered by the distributed network.

55. The method of claim 1, wherein the service offers are submitted via a world-wide-web site.

56. The method of claim 1, wherein the purchase requests are submitted via a world-wide-web site.

57. The method of claim 1, wherein the service offers are submitted via a telecommunication node connected to a clearing node.

58. The method of claim 1, wherein the purchase requests are submitted via a telecommunications node connected to a clearing node.

59. The method of claim 1, wherein the service offers are submitted using a template comprising the following fields:
an offer number field;
a provider name field;
a provider identification number field;
a password field;
a date/time submitted field;
a quality field;
an originating location field;
a terminating location field;
a bandwidth/time available field;
a number of circuits field;
a price field; and
an hours of operation field.

60. The method of claim 1, wherein the service requests are submitted using a template comprising the following fields:

a request number field;

a requester name field;

a requester identification number field;

a password field;

a date/time submitted field;

a quality field;

an originating location field;

a terminating location field;

a bandwidth/time requested field;

a number of circuits field; and an hours of operation field.

61. The method of claim 1, wherein one of the parameters that define a service offer is connection quality.

62. The method of claim 1, wherein one of the parameters that define a service offer is service type.

63. The method of claim 1, wherein one of the parameters that define a service offer is post dial delay.

64. The method of claim 1, wherein one of the parameters that define a service offer is legal restrictions.

65. The method of claim 1, wherein one of the parameters that define a service offer is compression level.

66. The method of claim 1, wherein one of the parameters that define a service offer is compression type.

67. The method of claim 1, wherein one of the parameters that define a service offer is equipment type.

68. The method of claim 1, wherein one of the parameters that define a service offer is signaling compatibility.

69. The method of claim 1, wherein one of the parameters that define a service offer is maximum latency.

70. The method of claim 1, wherein one of the parameters that define a service offer is a field that indicates whether the service provider will provide local termination for communications under the offer.

71. The method of claim 70, sales of communication service offered without local termination are brokered only to buyers that do not require local termination.

72. The method of claim 71, wherein the template further comprises a valid until field.

73. The method of claim 71, wherein price and hours of operation fields comprise a table listing distinct prices for distinct periods of time.

74. The method of claim 1, wherein one of the parameters that define a service offer is a field that indicates whether communications covered by the offer will trigger a settlement agreement.

75. The method of claim 74, wherein the distinct periods of time are described in terms of a calendar.

76. The method of claim 1, wherein one of the parameters that define a service offer is a field that indicates whether communications covered by the offer will be carried via a private line.

77. The method of claim 1, wherein one of the parameters that define a service offer is a field that indicates whether communications covered by the offer will be carried via a private network.

78. The method of claim 1, wherein one of the parameters that define a service offer is a field that indicates whether communications covered by the offer will be carried via satellite.

79. The method of claim 1, wherein one of the parameters that define a service offer is usage pattern.

80. The method of claim 79, wherein a plurality of transactions are brokered so that two or more buyers requiring complementary communication services usage patterns purchase communication services from one service provider.

81. The method of claim 1, wherein one of the parameters that defines a service offer is termination options, including fax bypass.

82. The method of claim 1, wherein one of the parameters that defines a service offer is carrier preference.

83. The method of claim 82, wherein carrier preference overrides other parameters.

84. The method of claim 82, wherein carrier preference establishes an explicit, specified cost margin that must be exceeded to override the preference.

85. The method of claim 1, wherein buyers are required to provide a password that is above a predetermined level before being permitted to submit purchase requests.

86. The method of claim 1, wherein sellers are required to provide a password having a level above the predetermined level before being permitted to submit service offers.

87. The method of claim 1, wherein one of the parameters that defines a route is quality.

88. The method of claim 87, wherein the quality rating of a route may be decreased if the route comprises two or more satellite legs.

89. The method of claim 87, wherein the quality rating of a route may be determined as a function of the type of link employed to carry communications via the route.

90. The method of claim 1, wherein the accuracy of at least one of the parameters that make up the submitted service offers is independently verified.

91. The method of claim 1, wherein a purchase request submitted by a buyer is filled by brokering at least two sales of communications service, a first sale between a first seller and the buyer and a second sale between a second seller and the buyer.

92. The method of claim 1, wherein a purchase request comprises a sort-by parameter regarding the rank order of importance to the buyer of at least one of the other parameters that define the request.

93. The method of claim 1, wherein a purchase request comprises an unacceptable carrier parameter.

94. The method of claim 1, wherein a purchase request comprises a preferred service providers parameter.

95. The method of claim 1, further comprising a clearing node that manages a futures market in communication services.

96. The method of claim 1, further comprising a clearing node that manages a derivatives market in communications services.

97. The method of claim 1, wherein the offer price represents the lowest price that the seller is willing to accept for the offered communication services.

98. The method of claim 1, wherein the request price represents the highest price that the purchaser is willing to pay for the requested communication services.

99. A method for trading telecommunications service, comprising:

receiving service offers by a server node from a plurality of sellers, each service offer constituting an offer to sell a telecommunications service for a route connecting a pair of locations in a network, each service offer comprising at least two of a plurality of parameters, the parameters comprising:

price information;

an origination location; and a destination location;

receiving service requests by the server node from a plurality of buyers, each service request requesting purchase of a telecommunications service each service request comprising two or more parameters, the parameters comprising:

price information;
an origination location; and
a termination location;

matching service requests provided by buyers to at least a portion of one or more service offers provided by sellers;

identifying one or more routes for transmitting the telecommunications service from a first location to a second location based on the matched service requests, each of the identified routes comprising one or more calling legs; and brokering a transaction that effects a transfer of ownership of at least a portion of the telecommunications connect time specified in the matched service offers from each seller to a respective buyer.

100. The method of claim 99, further comprising the step of updating an account balance of each seller and buyer by the server node.

101. The method of claim 99, further comprising the step of configuring a telecommunication node to route telecommunications services according to the identified routes.

* * * * *